US008616668B2

(12) United States Patent  (10) Patent No.: US 8,616,668 B2
Saito et al.  (45) Date of Patent: Dec. 31, 2013

(54) IMAGE PROCESSING APPARATUS, PRINTING APPARATUS, AND IMAGE PROCESSING METHOD

(75) Inventors: Senichi Saito, Kawasaki (JP); Ryosuke Iguchi, Kawasaki (JP); Nobutaka Miyake, Yokohama (JP); Tohru Ikeda, Yokohama (JP); Akitoshi Yamada, Yokohama (JP); Mitsuhiro Ono, Tokyo (JP); Fumitaka Goto, Tokyo (JP); Hidetsugu Kagawa, Kawasaki (JP); Tomokazu Ishikawa, Kawasaki (JP); Junichi Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 12/966,848

(22) Filed: Dec. 13, 2010

(65) Prior Publication Data
US 2012/0081444 A1  Apr. 5, 2012

(30) Foreign Application Priority Data

Oct. 5, 2010 (JP) ................................. 2010-225750

(51) Int. Cl.
B41J 2/205 (2006.01)
B41J 29/393 (2006.01)
B41J 2/21 (2006.01)

(52) U.S. Cl.
USPC ................. 347/15; 347/19; 347/43

(58) Field of Classification Search
USPC ........................................................... 347/15
See application file for complete search history.

(56) References Cited

U.S. PATENT DOCUMENTS

| | | | |
|---|---|---|---|
| 6,025,929 A * | 2/2000 | Nakajima et al. | 358/1.9 |
| 6,814,420 B2 | 11/2004 | Fujita et al. | |
| 7,034,844 B2 | 4/2006 | Akiyama et al. | |
| 7,075,679 B2 | 7/2006 | Goto et al. | |
| 7,079,152 B2 | 7/2006 | Akiyama et al. | |
| 7,145,693 B2 | 12/2006 | Kagawa | |
| 7,266,239 B2 | 9/2007 | Akiyama et al. | |
| 7,274,491 B2 | 9/2007 | Yamada et al. | |

(Continued)

FOREIGN PATENT DOCUMENTS

JP  10-13674  1/1998

OTHER PUBLICATIONS

U.S. Patent Appl. No. 12/962,875 filed Dec. 8, 2010, Kiyoshi Umeda, et al.
U.S. Patent Application No. 12/962,889 filed Dec. 8, 2010. Applicants: Hiroyuki Sakai, et al.
U.S. Patent Application No. 12/962,895 filed Dec. 8, 2010. Applicants: Junichi Nakagawa, et al.
U.S. Patent Application No. 12/966,265 filed Dec. 13, 2010. Applicants: Nobutaka Miyake, et al.
U.S. Patent Application No. 12/966,743 filed Dec. 13, 2010. Applicants: Ryosuke Iguchi, et al.
U.S. Patent Application No. 12/966,757 filed Dec. 13, 2010. Applicants: Makoto Torigoe, et al.
U.S. Patent Application No. 12/966,769 filed Dec. 13, 2010. Applicants: Tohru Ikeda, et al.
U.S. Patent Application No. 12/966,781 filed Dec. 13, 2010. Applicants: Fumitaka Goto, et al.
U.S. Patent Application No. 12/966,799 filed Dec. 13, 2010. Applicants: Tomokazu Ishikawa, et al.
U.S. Patent Application No. 12/966,823 filed Dec. 13, 2010. Applicants: Akitoshi Yamada, et al.
U.S. Patent Application No. 12/966,837 filed Dec. 13, 2010. Applicants: Mitsuhiro Ono, et al.

Primary Examiner — Uyen Chau N Le
Assistant Examiner — Kajli Prince
(74) Attorney, Agent, or Firm — Fitzpatrick, Cella, Harper & Scinto

(57) ABSTRACT

Provided are an image processing apparatus and an image processing method capable of reducing color unevenness due to variations in ejection characteristics among a plurality of nozzles when printing an image using a plurality of inks. To that end, a first image which is made up a color with noticeable color unevenness and similar colors is printed onto a print medium. The user then specifies a color and a nozzle position where color unevenness has occurred. On the basis of these results, parameters are set for a correction table referenced by are MCS processor. In so doing, it becomes possible to address the factor causing the color unevenness, and mitigate the effects of color unevenness in a focused way without incurring increases in processor load, memory requirements, or processing time as compared to the case of calibrating all lattice points.

13 Claims, 21 Drawing Sheets

(56) References Cited

U.S. PATENT DOCUMENTS

| | | |
|---|---|---|
| 7,339,703 B2 | 3/2008 | Kagawa |
| 7,342,684 B2 | 3/2008 | Imafuku et al. |
| 7,411,707 B2 | 8/2008 | Ikeda |
| 7,639,399 B2 | 12/2009 | Ikeda |
| 7,643,178 B2 | 1/2010 | Yamada et al. |
| 7,684,063 B2 | 3/2010 | Fujita et al. |
| 7,750,921 B2 | 7/2010 | Akiyama et al. |
| 7,912,280 B2 | 3/2011 | Miyagi et al. |
| 2007/0146752 A1 | 6/2007 | Iguchi |
| 2008/0144060 A1 | 6/2008 | Ishikawa |
| 2008/0239353 A1 | 10/2008 | Hori et al. |
| 2008/0239355 A1 | 10/2008 | Goto et al. |
| 2008/0239410 A1 | 10/2008 | Hashii et al. |
| 2009/0034838 A1 | 2/2009 | Umeda et al. |
| 2011/0038020 A1 | 2/2011 | Kagawa |

\* cited by examiner

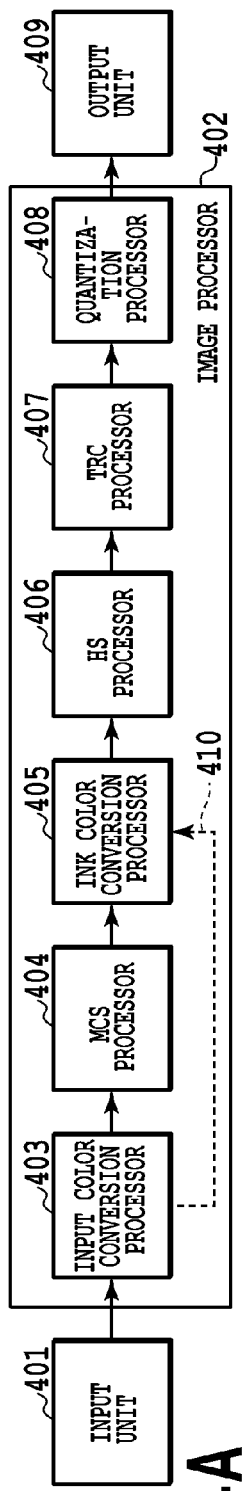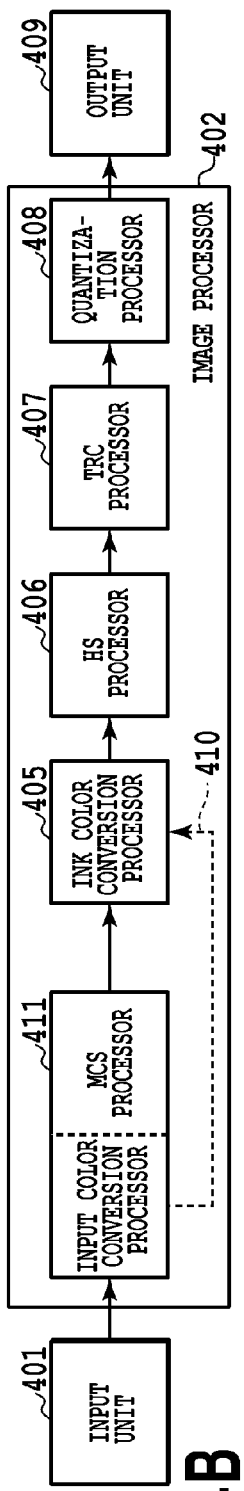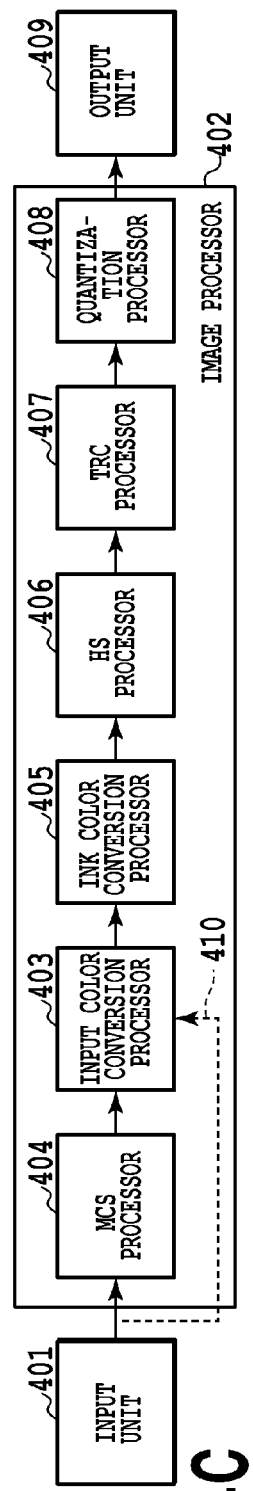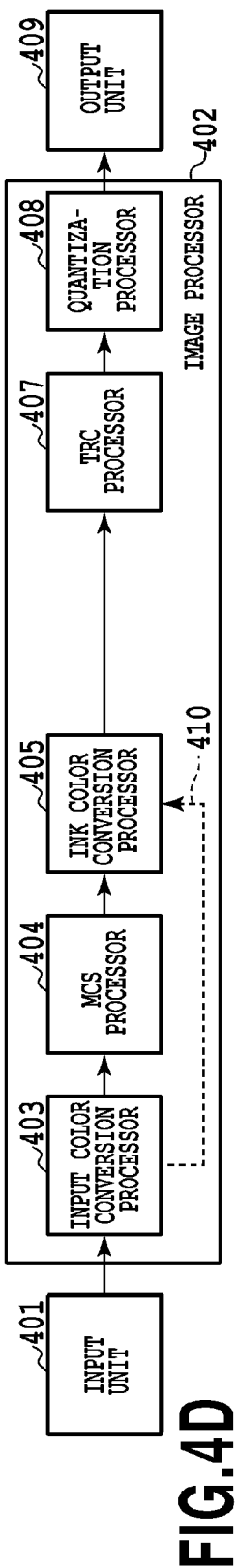

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, a printing apparatus, and an image processing method. More particularly, the present invention relates to an image processing apparatus configured to reduce color unevenness caused by individual variations in the ejection characteristics of a plurality of nozzles that eject ink.

2. Description of the Related Art

In print heads used in inkjet printing apparatus, individual variations are sometimes exhibited in the ejection characteristics (i.e., the ejection volume and ejection direction, for example) of a plurality of nozzles, due to manufacturing errors and other factors. When such variation exists, printed images become more susceptible to density unevenness.

In the related art, one established process for decreasing such density unevenness involves using head shading technology such as that disclosed in Japanese Patent Laid-Open No. H10-13674(1998). Head shading is a technology that corrects image data according to information regarding the ejection characteristics of individual nozzles. By means of such correction, the number of ink dots that are ultimately printed is increased or decreased for each nozzle, and the density in the printed image can be made nearly uniform across the nozzles.

However, when head shading technology as described above is used, if two or more types of ink are combined for color reproduction, then a phenomenon will occur wherein the coloration in the areas printed with the nozzles having non-standard ejection volumes will differ from the colors that should be printed. In other words, the above might cause inaccurate color, herein referred to as color difference.

By way of example, consider the case of printing a blue image using nozzles exhibiting standard election volumes for cyan ink, and greater-than-standard ejection volumes for magenta ink. In this case, the magenta ink with the greater-than-standard ejection volumes will form dots on the print medium that are larger than the cyan dots. If such print heads are corrected by means of head shading (i.e., an HS process), then magenta will be printed using fewer dots than the standard number of dots. In other words, the number of magenta dots will be less than the number of cyan dots. As a result, the blue image regions will contain a mixture of solid cyan dots of standard size, as well as overlapping dots wherein cyan dots are printed inside larger magenta dots. The coloration in such regions will be different from the coloration in a blue image printed using cyan dots and magenta dots of standard size and number. This occurs because the ratio of the print medium occupied by solid cyan, the ratio occupied by solid magenta, and the ratio occupied by blue resulting from overlapping cyan and magenta, all differ between the above two images. Such variation in the surface area ratios occupied by respective colors occurs not only because of variations in ejection volume variation, but also because of variations in ejection direction. In other words, even if density unevenness in solid cyan images or solid magenta images is resolved by the head shading of the related art, the variation in ejection characteristics will still lead to color difference in blue images expressed by overlapping combinations of these colors. Furthermore, since the degree of color difference differs among the regions printed by nozzles with different ejection characteristics, different color are perceived in individual regions that should have the same coloring, which is noticed as color unevenness.

SUMMARY OF THE INVENTION

The present invention has been devised in order to solve the above problems. Consequently, it is an object of the present invention to reduce color unevenness caused by individual variations in the ejection characteristics of a plurality of nozzles when printing an image using a plurality of ink colors.

The first aspect of the present invention is an image processing apparatus which processes color signals as part of a process for converting input image data into color signals corresponding to ink of plural colors, for the purpose of printing an image onto a print medium by using print heads, upon which a plurality of nozzle arrays for ejecting the ink of plural colors are arranged, the image processing apparatus comprising: a converting unit configured to convert the input image data by using conversion table parameters associated with positions of nozzles on the print heads; a first setting unit configured to set a color formed by the overlap of ink for at least two colors; a first generating unit configured to set a plurality of detection colors on the basis of the color set by the first setting unit, and generate first image data made up of patches of the plurality of detection colors; a first test printing unit configured print an image of the first image data by using the print heads; a first information acquiring unit configured to acquire information regarding a specified detection color from among the plurality of detection colors in the image printed by the first test printing unit, wherein the specified detection color has been confirmed to exhibit color unevenness due to variations in ejection characteristics among the plurality of nozzles, and a specified position specified as the position of nozzles on the print heads where the color unevenness was confirmed; a second generating unit configured to generate second image data made up of a plurality of color correction patches in which the specified detection color is set for all nozzle positions other than the specified position, and a plurality of colors that differ from the specified detection color are set for the nozzles at the specified position for each of the plurality of color correction patches; a second test printing unit configured to print an image of the second image data by using the print heads; a second information acquiring unit configured to acquire information regarding a color correction patch in the second test print where the color unevenness has been reduced compared to the first test print; and a producing unit configured to produce the conversion table parameters corresponding to the nozzles at the specified position in accordance with the information acquired by the second information acquiring unit.

The second aspect of the present invention is an image processing method to process color signals as part of a process for converting input image data into color signals corresponding to inks of plural colors, for the purpose of printing an image onto a print medium by using print heads, upon which a plurality of nozzle arrays for ejecting the ink of plural colors are arranged, the image processing method comprising the steps of: converting the input image data by using conversion table parameters associated with positions of nozzles on the print heads; a first setting for setting a color formed by the overlap of ink for at least two colors; a first generating for setting a plurality of detection colors on the basis of the color set by the first setting operation, and generating first image data made up of patches of the plurality of detection colors; a first test printing for printing an image of the first image data by using the print heads; a first information acquiring for acquiring information regarding a specified detection color from among the plurality of detection colors in the image printed by the first test printing operation, wherein the specified detection color has been confirmed to exhibit color unevenness due to variations in ejection characteristics among the plurality of nozzles, and a specified position specified as the position of nozzles on the print heads where the color unevenness was confirmed; a second generating for generating second image data made up of a plurality of color correction patches in which the specified detection color is set for all nozzle positions other than the specified position, and a plurality of colors that differ from the specified detection color are set for the nozzles at the specified position for each of the plurality of color correction patches; a second test printing for printing an image of the second image data by using the print heads; a second information acquiring for acquiring information regarding a color correction patch in the second test print where the color unevenness has been reduced compared to the first test print; and producing the conversion table parameters corresponding to the nozzles at the specified position in accordance with the information acquired by the second information acquiring step.

The third aspect of the present invention is a printing apparatus which processes color signals as part of a process for converting input image data into color signals corresponding to ink of plural colors, for the purpose of printing an image onto a print medium by using print heads, upon which a plurality of nozzle arrays for ejecting the ink of plural colors are arranged, the image processing apparatus comprising: a converting unit configured to convert the input image data by using conversion table parameters associated with positions of nozzles on the print heads; a first setting unit configured to set a color formed by the overlap of ink for at least two colors; a first generating unit configured to set a plurality of detection colors on the basis of the color set by the first setting means, and generate first image data made up of patches of the plurality of detection colors; a first test printing unit configured to print an image of the first image data by using the print heads; a first information acquiring unit configured to acquire information regarding a specified detection color from among the plurality of detection colors in the image printed by the first test printing unit, wherein the specified detection color has been confirmed to exhibit color unevenness due to variations in ejection characteristics among the plurality of nozzles, and a specified position specified as the position of nozzles on the print heads where the color unevenness was confirmed; a second generating unit configured to generate second image data made up of a plurality of color correction patches in which the specified detection color is set for all nozzle positions other than the specified position, and a plurality of colors that differ from the specified detection color are set for the nozzles at the specified position for each of the plurality of color correction patches; a second test printing unit configured to print an image of the second image data by using the print heads; a second information acquiring unit configured to acquire information regarding a color correction patch in the second test print where the color unevenness has been reduced compared to the first test print; and a producing unit configured to produce the conversion table parameters corresponding to the nozzles at the specified position in accordance with the information acquired by the second information acquiring unit.

Further features of the present invention will become apparent from the following description of exemplary embodiments (with reference to the attached drawings).

BRIEF DESCRIPTION OF THE DRAWINGS

FIGS. 4A to 4D are block diagrams illustrating configurations of image processing operations executed by an inkjet printer in accordance with embodiments of the present invention;

DESCRIPTION OF THE EMBODIMENTS

Hereinafter, embodiments of the present invention will be described in detail and with reference to the drawings.

Figure 1:
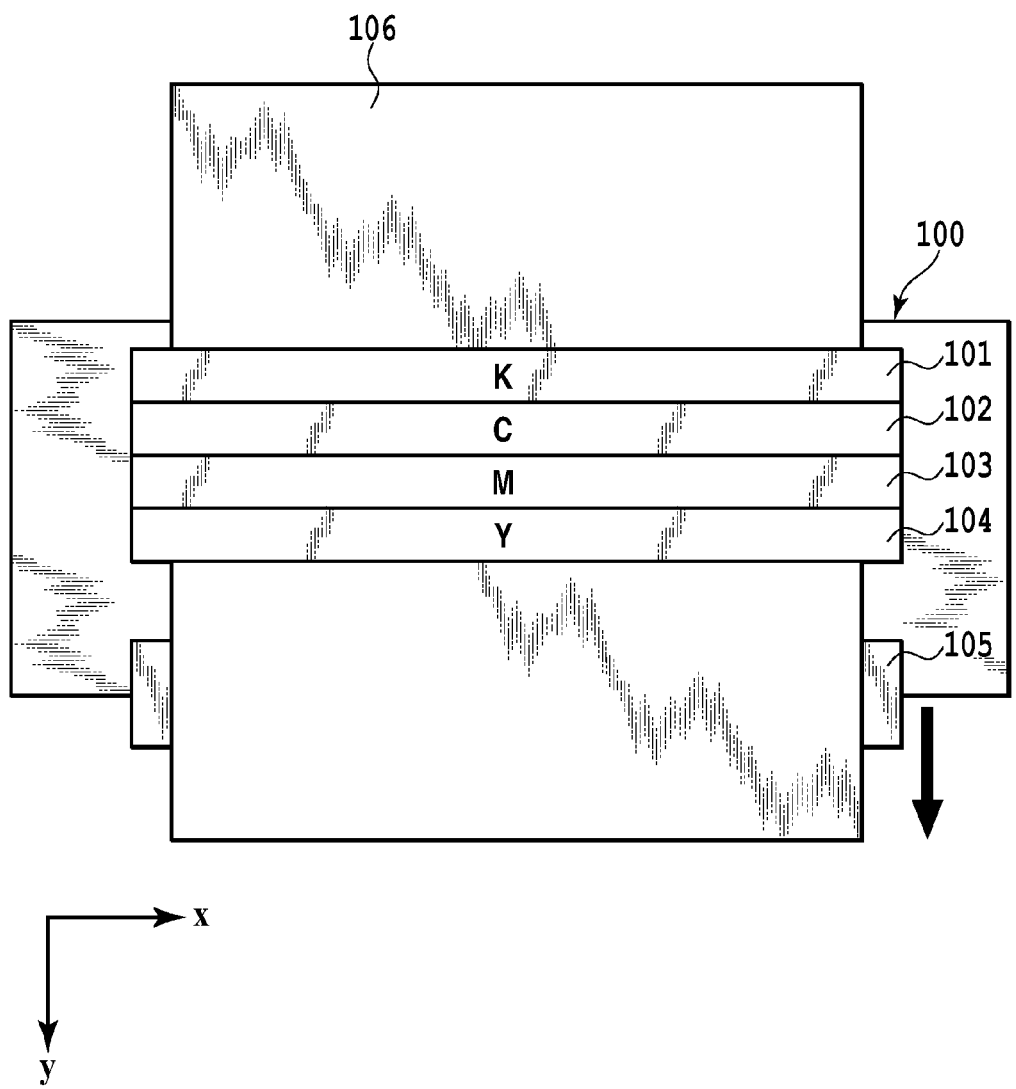
FIG. 1 schematically illustrates an inkjet printer in accordance with an embodiment of the present invention.

FIG. 1 schematically illustrates an inkjet printer (printing apparatus) in accordance with an embodiment of the present invention. The printer in the present embodiment is a full-line type printing apparatus, and as illustrated in FIG. 1, the printer is provided with four nozzle arrays 101 to 104 on a frame that acts as the printer's structural member. On each of the nozzle arrays 101 to 104, a plurality of nozzles ejecting the same type of ink is arranged along the X direction at a pitch of 1200 dpi and in accordance with the width of the printing paper 106. The nozzle arrays 101 to 104 eject black (K), cyan (C), magenta (M), and yellow (Y) ink, respectively. By arranging these nozzle arrays 101 to 104 ejecting multiple colors of ink in the Y direction parallel to each other, the print heads of the present embodiment are realized.

The printing paper 106 herein acting as a print medium is conveyed in the Y direction orthogonal to the X direction in the drawings by means of a conveying roller 105 (as well as other rollers not illustrated), which rotates due to the driving force of a motor (not illustrated). While the printing paper 106 is being conveyed, the plurality of nozzles on each of the print heads 101 to 104 conduct ejection operations according to print data and at a frequency that corresponds to the conveying speed of the printing paper 106. As a result of the relative motion between the print heads executing such ejection operations and the print medium, dots of respective colors are printed at a predetermined resolution in accordance with the print data, and a single-page image is formed on the printing paper 106.

Figure 2:
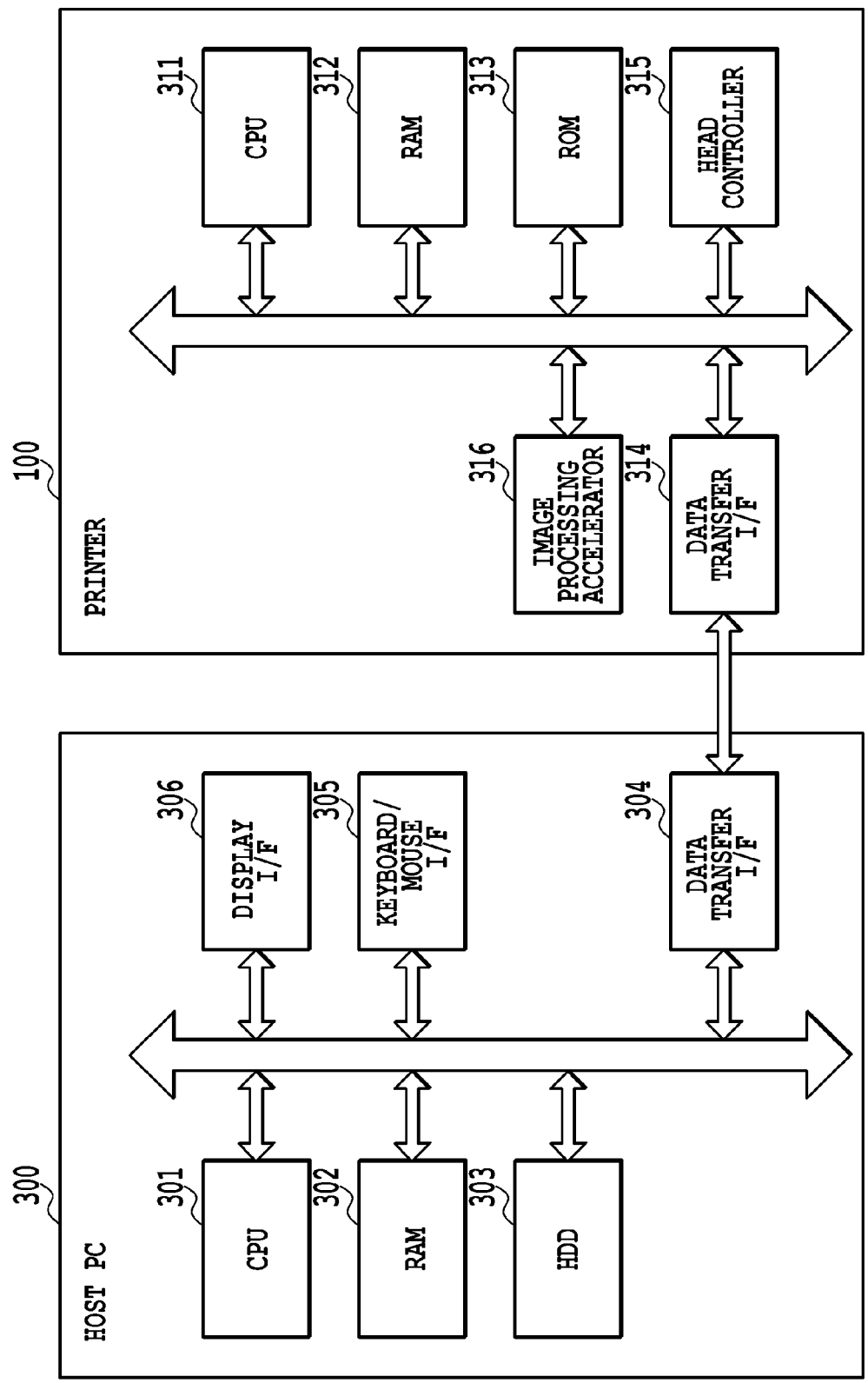
FIG. 2 is a block diagram illustrating a printing system in accordance with an embodiment of the present invention.

FIG. 2 is a block diagram illustrating a printing system in accordance with an embodiment of the present invention. As illustrated in FIG. 2, the printing system includes the printer 100 (i.e., printing apparatus) illustrated in FIG. 1, as well as a personal computer (PC) 300, which acts as a host device.

The host PC 300 primarily includes the following components. The CPU 301 executes processes according to programs stored in the HDD 303 and the RAM 302. The RAM 302 is volatile storage, and temporarily stores programs and data. The HDD 303 is non-volatile storage and similarly stores programs and data. In the present embodiment, the MCS data characteristic to the present invention and hereinafter described is also usually stored in the HDD 303. The data transfer interface (IF) 304 controls the sending and receiving of data with respect to the printer 100. The connection protocol used for this sending and receiving of data may be USB, IEEE 1394, or LAN, for example. The keyboard/mouse I/F 305 is an I/F that controls a keyboard, mouse, or other human interface device (HID). Via this I/F, the user is able to input information. The display I/F 306 controls the display of information on a display (not shown).

Meanwhile, the printer 100 primarily includes the following components. Following programs stored in the ROM 313 and the RAM 312, the CPU 311 executes the processes of the respective embodiments hereinafter described. The RAM 312 is volatile storage, and temporarily stores programs and data. The ROM 313 is non-volatile storage, and is able to store programs and table data used in the processes hereinafter described.

The data transfer I/F 314 controls the sending and receiving of data with respect to the PC 300. The head controller 315 supplies print data to each of the print heads 101 to 104 illustrated in FIG. 1, and also controls the ejection operations of the print heads. More specifically, the head controller 315 may be configured to read control parameters and print data from particular addresses in the RAM 312. When the CPU 311 writes control parameters and print data to the particular addresses in the RAM 312, a process is launched by the head controller 315 and ink is ejected from the print heads.

The image processing accelerator 316 is hardware that is able to execute image processing faster than the CPU 311. More specifically, the image processing accelerator 316 is configured to read parameters and data relevant to image processing from particular addresses in the RAM 312. When the CPU 311 writes such parameters and data to the particular addresses in the RAM 312, the image processing accelerator 316 is activated, and the data is subjected to predetermined image processing. In the present embodiment, the parameters of a table used by an MCS processor to be hereinafter described are created by a process executed in software by the CPU 311. In contrast, image processing at the time of printing, including the processes of the MCS processor, are executed in hardware by the image processing accelerator 316. It should also be appreciated that the image processing accelerator 316 is not a required component, and that depending on the printer specifications and other factors, both the above process for creating table parameters as well as the image processing may be executed by the CPU 311 alone.

Given the printing system described above, the following will describe embodiments for reducing color unevenness caused by individual variations in the ejection characteristics of a plurality of nozzles when printing an image using a plurality of inks.

Figure 3A:
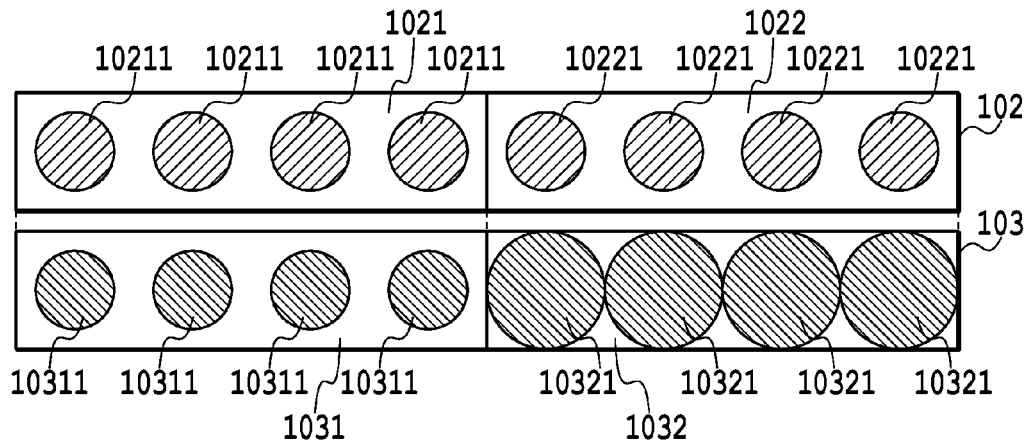
FIGS. 3A to 3C are diagrams for explaining how color unevenness is produced when printing a blue image after having conducted head shading of the related art.
Figure 3B:
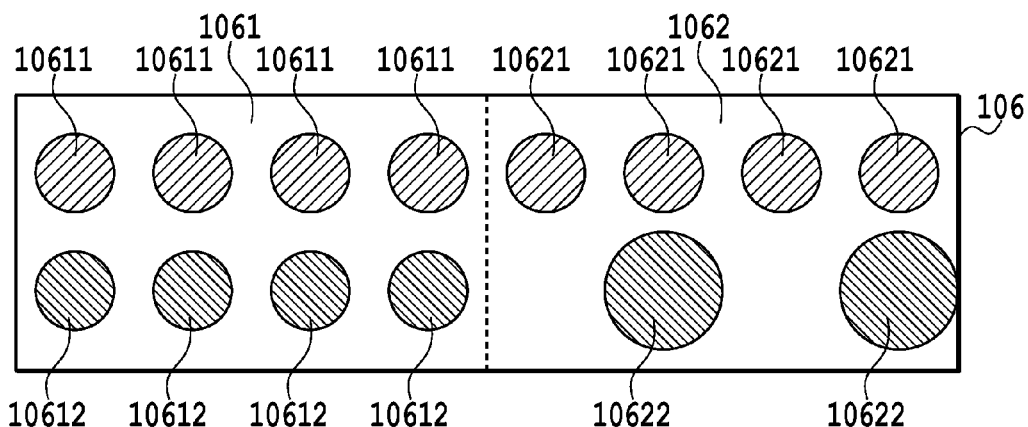
Figure 3C:
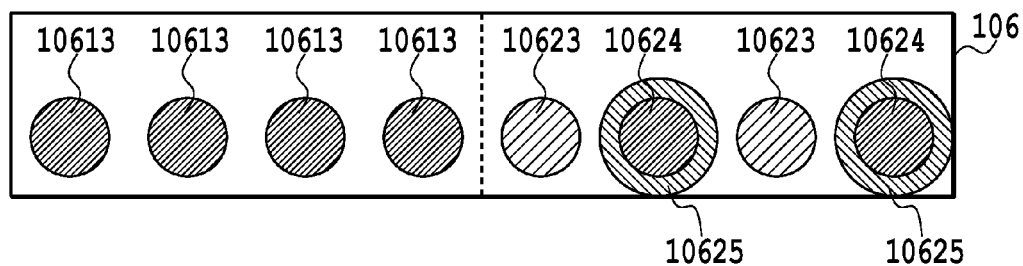

FIGS. 3A to 3C are diagrams for explaining how color unevenness is produced when printing a blue image expressed by a combination of two inks after having conducted head shading of the related art. In FIG. 3A, 102 represents a print head that ejects cyan ink, and 103 represents a print head that ejects magenta ink. Also, for the sake of simplification in both illustration and description, only eight nozzles from among the plurality of nozzles in each print head are illustrated in FIG. 3A. Also, since color unevenness will be described for the case of printing blue using cyan and magenta ink, only the two print heads for cyan and magenta are illustrated.

The eight nozzles 10211 and 10221 of the cyan ink print head 102 are all able to eject a standard volume of ink in a standard direction, and same-size dots are printed at equal intervals on the print medium. In contrast, although the ejection directions are all normal for the eight nozzles of the magenta print head 103, the four nozzles 10311 on the left side of FIG. 3A exhibit standard ejection volumes, while the four nozzles 10321 on the right side exhibit greater-than-standard ejection volumes. Consequently, whereas magenta dots equal in size to the cyan dots are printed in the area on the left side of FIG. 3A (the first area), magenta dots larger than the cyan dots are printed at fixed intervals equal to the cyan dots in the area on the right side (the second area).

If image data is corrected by the head shading of the related art when using print heads with such ejection characteristics, then the image data corresponding to the magenta nozzles 10321 will be corrected in a decreasing direction. As a result, dot data (i.e., binary data) specifying whether to print (1) or not print (0) individual dots will be generated such that the number of dots ultimately printed by the magenta nozzles 10321 becomes less than the number of dots printed by the magenta nozzles 10311.

FIG. 3B illustrates how dots are printed in the case where printing is conducted on the basis of dot data resulting from applying head shading correction to a solid image, or in other words, image data wherein both cyan and magenta have 100% duty. For the sake of explanation herein, FIG. 3B illustrates the cyan dots and magenta dots without overlapping. In FIG. 3B, 10611 represents dots printed onto the printing paper by the cyan nozzles 10211, and 10621 represents dots printed onto the printing paper by the cyan nozzles 10221. Also, 10612 represents dots printed onto the printing paper by the magenta nozzles 10311, and 10622 represents dots printed onto the printing paper by the magenta nozzles 10321. In FIGS. 3A to 3C herein, the size of the individual nozzles and the size of the dots printed by each nozzle are illustrated as being equal in size. However, it should be appreciated that the nozzles and dots are illustrated in this way in order to associate the two in the explanation herein, and that in practice the nozzles and dots are not equal in size.

FIG. 3B illustrates the case where the surface area of the dots formed on the printing paper by the magenta nozzles 10321 are double the surface area of the dots formed by the magenta nozzles 10311. In this case, by reducing the number of ejections from the magenta nozzles 10321 to approximately ½ (i.e., from four dots to two dots) of that from the magenta nozzle 10311, head shading is able to make the surface area of the printed paper that is covered in magenta roughly equal. However, this example of reducing the number of double-area dots to ½ is given to simplify explanation. In actual practice, the relationship between the coverage area and the detected density is not necessarily proportional. Thus, with typical head shading, the number of dots printed in each area is adjusted so that the detected density becomes nearly uniform across all nozzle areas.

FIG. 3C illustrates the results of printing on the basis of dot data obtained by head shading, herein showing the printed state with the cyan dots and magenta dots overlapping each other. In FIG. 3C, in the first area of the printing paper 106, standard size cyan dots and magenta dots are printed overlapping each other, thereby forming standard size blue dots 10613. In contrast, in the second area, standard size cyan dots 10623 are mixed with blue dots formed by the overlap of standard size cyan dots with double-size magenta dots. Furthermore, the blue dots formed by the overlap of standard size cyan dots with double size magenta dots can be subdivided into two areas: a blue area 10624, where the cyan and the magenta are completely overlapping; and a surrounding magenta area 10625.

In the HS process, the numbers of printed dots are adjusted to make the following quantities equal to each other: the total surface area of the cyan areas (i.e., dots) 10623; the total surface area of the blue areas 10624; and the total surface area of the magenta areas 10625. Consequently, if the color observed as a result of the combination of the light absorption characteristic of the cyan areas 10623 with the light absorption characteristic of the magenta areas 10625 is equivalent to the color observed as a result of the light absorption characteristic of the blue areas 10624, then those areas will appear to be almost identical in color to the blue areas 10624. As a result, the blue image in the first area on the printing paper 106 will appear to be the same color as the blue image in the second area.

However, in cases where an area is formed by overlapping a plurality of different of inks like the blue areas 10624, the color observed as a result of that area's light absorption characteristic will not necessarily match the color observed as a result of the combination of the light absorption characteristic in the respective areas of the plurality of inks. As a result, a color will be produced that is deviated from the standard color intended in the region as a whole. This in turn causes the blue image in the first area of the printing paper 106 to be perceived as a different color from the blue image in the second area.

The present invention attempts to reduce color difference produced by combinations of two or more inks in this way by correcting the image data. To this end, a different correction is applied to magenta data in the case of printing 100% blue than in the case of printing a 100% magenta image. Additionally, a different correction is applied to cyan data in the case of printing 100% blue than in the case of printing a 100% cyan image. Such cyan and magenta correction in 100% blue images is also strictly established only for 100% blue images.

FIGS. 7A to 7D are diagrams explaining color unevenness in a 25% blue image after having conducted head shading of the related art. In this case, different colors are likewise perceived in the first area and the second area. In addition, the suitable correction of cyan and magenta for suppressing the color difference in this case differs from the correction for the case of the 100% blue image illustrated in FIGS. 3A to 3C. Furthermore, the correction values are not computed from the correction values for the 100% blue case with a simple linear approximation.

FIGS. 8A to 8D are diagrams explaining color unevenness in an image expressed by printing 25% yellow in addition to the 25% blue image illustrated in FIGS. 7A to 7D. In FIGS. 8A to 8D, 10614 represents the dots printed in the first area by the yellow nozzles 10411, and 10626 represents the dots printed in the second area by the yellow nozzles 10421. In this case, the coloration in the first area, which is determined by the light absorption characteristic of the blue areas 10613 and the yellow areas 10614, differs from the coloration in the second area, which is determined by the light absorption characteristic of the blue areas 10623 and 10624, the magenta areas 10625, and the yellow areas 10626. In other words, different colors are perceived in the first area and the second area. Furthermore, the suitable correction with respect to cyan and magenta for suppressing the color difference point in this case differs from the correction for the case of printing 25% blue illustrated in FIGS. 7A to 7D, even if the yellow head 104 exhibits no ejection volume variation. Moreover, the correction values are not computed with a simple linear approximation.

FIGS. 9A to 11D are diagrams explaining color unevenness for the case of adding yellow to FIGS. 8A to 8D in 25% increments. In any of these cases, different colors are perceived in the first area and the second area, and the suitable correction values for suppressing color difference are not computed from any other correction values with a simple linear approximation.

In other words, color difference caused by magenta ejection volume variation is exhibited to various degrees in colors that use magenta, and in order to correct such color difference, it is necessary to convert (i.e., correct) the signal values not just for magenta, but for all ink colors used. Furthermore, the correction values used for this signal value conversion are not computed from data for nearby similar colors with a simple linear approximation. Thus, in order to suppress color unevenness over the entire color space, it is desirable to compute suitable correction values for all lattice points (i.e., for all combinations of CMYK signal values).

However, when the CMYK signal values take 256 tones, for example, the number of lattice points becomes 16.77 million. Printing patches, detecting color unevenness, and calculating correction values for all lattice points would thus involve a huge processing load, and lead to heavy expenditures of memory and processing time. On the other hand, the colors that exhibit noticeable color unevenness due to one particular factor are limited to a certain degree, and in many cases constitute just a small portion of the entire color space. As a more specific example, the colors that exhibit noticeable color unevenness due to magenta ejection volume variation are colors close to blue, and in red or green regions, or in color having the lightness of extremely high or extremely low, the color unevenness is not perceived in some cases.

Being devised in light of such circumstances, the present invention extracts an uneven color that particularly exhibits noticeable color unevenness (such as 25% blue, for example), and estimates similar colors that may be susceptible to color unevenness due to the same factor as the uneven color (i.e., magenta ejection volume variation). Subsequently, patches are printing, uneven color is detected, and correction values are computed, only for the uneven color and the similar colors. In so doing, when a color with noticeable color unevenness is found, it becomes possible to address the factor causing the color unevenness, and mitigate the effects of the color unevenness in a focused way.

Hereinafter, specific embodiments will be described.

First Embodiment

FIG. 4A is a block diagram illustrating a configuration of image processing operations executed by an inkjet printer in accordance with the first embodiment of the present invention. In other words, in the present embodiment, an image processing apparatus is realized by means of various components for executing the controls and processes of the printer 100 illustrated in FIG. 2. However, it should be appreciated that the application of the present invention is not limited to such an embodiment. For example, the image processing apparatus may also be realized in the host PC 300 illustrated in FIG. 2. Alternatively, a part of the image processing apparatus may be realized in the host PC 300, with the other parts realized in the printer 100.

As illustrated in FIG. 4A, the input unit 401 takes image data received from the host PC 300, and outputs the image data to the image processing apparatus 402. The image processing apparatus 402 includes an input color conversion processor 403, an MCS processor 404, an ink color conversion processor 405, an HS processor 406, a TRC processor 407, and a quantization processor 408.

The image processing conducted in the image processing apparatus 402 will now be described. In the image processor 402, first the input color conversion processor 403 takes the input image data received from the input unit 401, and converts the data into image data compatible with the printer's color reproduction range. In the present embodiment, the input image data is data that indicates color coordinates (R, G, B) in a color coordinate space, such as the sRGB space used for expressing color on monitors. The input color conversion processor 403 processes the 8-bit values of the input image data R, G, and B by using matrix operations or a three-dimensional lookup table (hereinafter, LUT). By means of such established techniques, the input image data (R, G, B) is converted into image data (R', G', B') in the printer's color reproduction range. This image data is expressed as a color signal made up of three elements. In the present embodiment, the conversion process is conducted using a three-dimensional LUT in conjunction with interpolation operations. Also, in the present embodiment, the resolution of the 8-bit image data handled in the image processor 402 is 600 dpi, whereas the resolution of the binary data obtained by the quantization of the quantization processor 408 is 1200 dpi, as described later.

The multi-color shading (MCS) processor 404 corrects the image data that has been converted by the input color conversion processor 403. As described later, this correction process also uses a correction table made up of a three-dimensional LUT. In the present embodiment, the nozzle arrays on each print head are subdivided along the x direction and managed in X nozzle groups of four nozzles each. Also, in the MCS process, each of the X nozzle groups is processed independently. By means of this correction process, the color unevenness described earlier can be reduced, even when there exist individual variations in the ejection characteristics among the nozzles of the print heads at the output unit 409. The specific contents of the table as well as the correction process executed by the MCS processor 404 that uses the table will be described later.

The ink color conversion processor 405 takes the image data containing the 8-bit R, G, and B values that were processed by the MCS processor 404, and converts the image data into image data that is in accordance with the color signal data of the inks used by the printer. Since the printer 100 of the present embodiment uses black (K), cyan (C), magenta (M), and yellow (Y) inks, the RGB signal image data is converted into image data made up of 8-bit color signals for K, C, M, and Y, respectively. This color conversion is conducted using an ink color conversion table in the form of a three-dimensional LUT in conjunction with interpolation operations, similarly to the process executed by the input color conversion processor described above.

The head shading (HS) processor 406 accepts the ink color signal image data, and converts the respective 8-bit data for each ink color into ink color signal image data according to the individual ejection volumes of the nozzles that constitute the print heads. In other words, the HS processor 406 conducts a process that is similar to the head shading process of the related art. In the present embodiment, this HS process is conducted using a one-dimensional LUT.

The tone reproduction curve (TRC) processor 407 takes the image data made up of respective HS-processed 8-bit ink color signals, and for each ink color, the TRC processor 407 corrects the ink color signals in order to adjust the number of dots printed by the output unit 409. Typically, the number of dots printed onto a print medium does not exist in a linear relationship with the optical density realized on the print medium as a result of that number of dots. Consequently, the TRC processor 407 corrects the respective 8-bit signals so as to adjust the number of dots printed onto the print medium in keeping with a linear relationship.

The quantization processor 408 quantizes the 8-bit, 256-value image data for each ink color that was processed by the TRC processor 407, and generates binary data containing single bits that specify whether to print (1) or not print (0). The configuration of the quantization processor 408 is not particularly limited in the application of the present invention. For example, the quantization processor 408 may be configured to directly convert the 8-bit image data into binary data (dot data), or alternatively, to first quantize the multi-value data into multi-value data of several bits, and then convert the quantized results into the final binary data. The method used for the quantization process may be an error diffusion method, a dithering method, or some other halftoning process.

On the basis of the binary data (dot data) obtained by quantization, the output unit 409 prints by driving the print heads and ejecting ink of respective colors onto a print medium. In the present embodiment, the output unit 409 is realized by means of a printing mechanism provided with the print heads 101 to 104 illustrated in FIG. 1.

In the present embodiment, conversion table parameters for the three-dimensional LUT used by the MCS processor 404 are created for each of the X nozzle groups. For this reason, a calibration process is executed, which involves the steps of printing test patterns, visually inspecting the patterns by the user, and inputting information from a UI. In addition, prior to executing this calibration process, the colors of the patches to be printed as test patterns (i.e., the detection colors) are first set.

Figure 5:
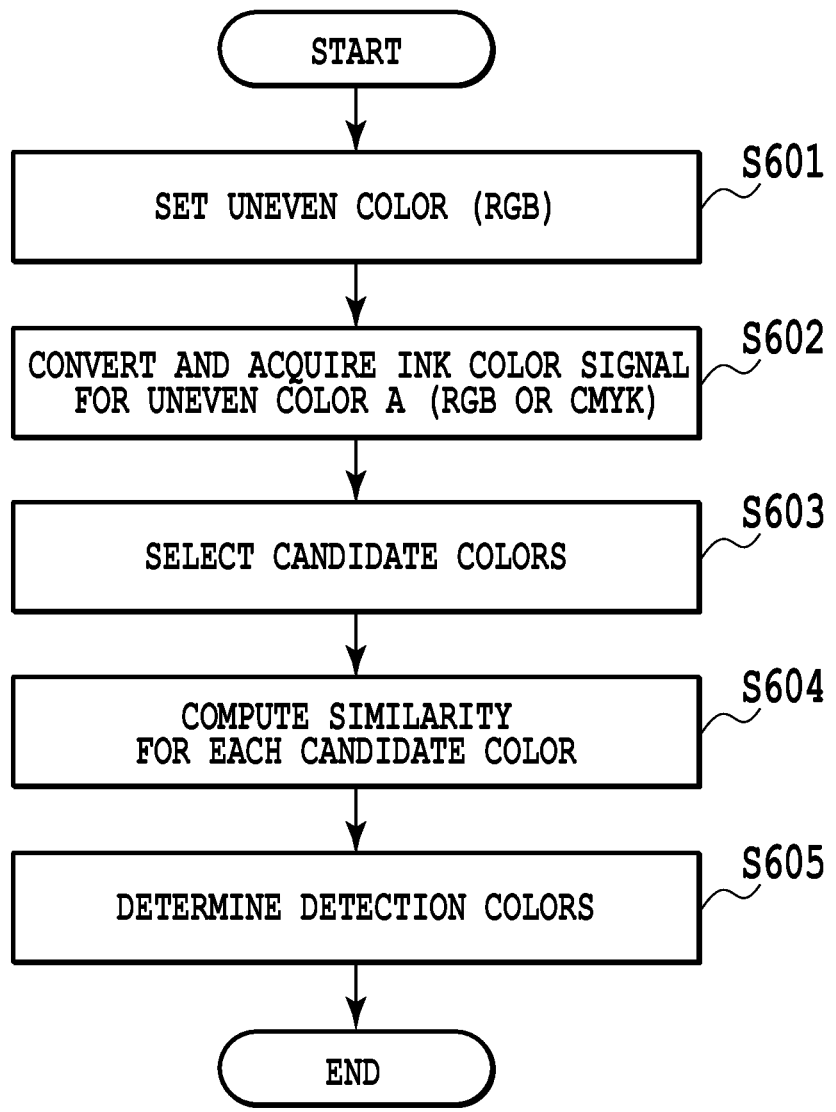
FIG. 5 is a flowchart for explaining a detection color setting operation.
Figure 18:
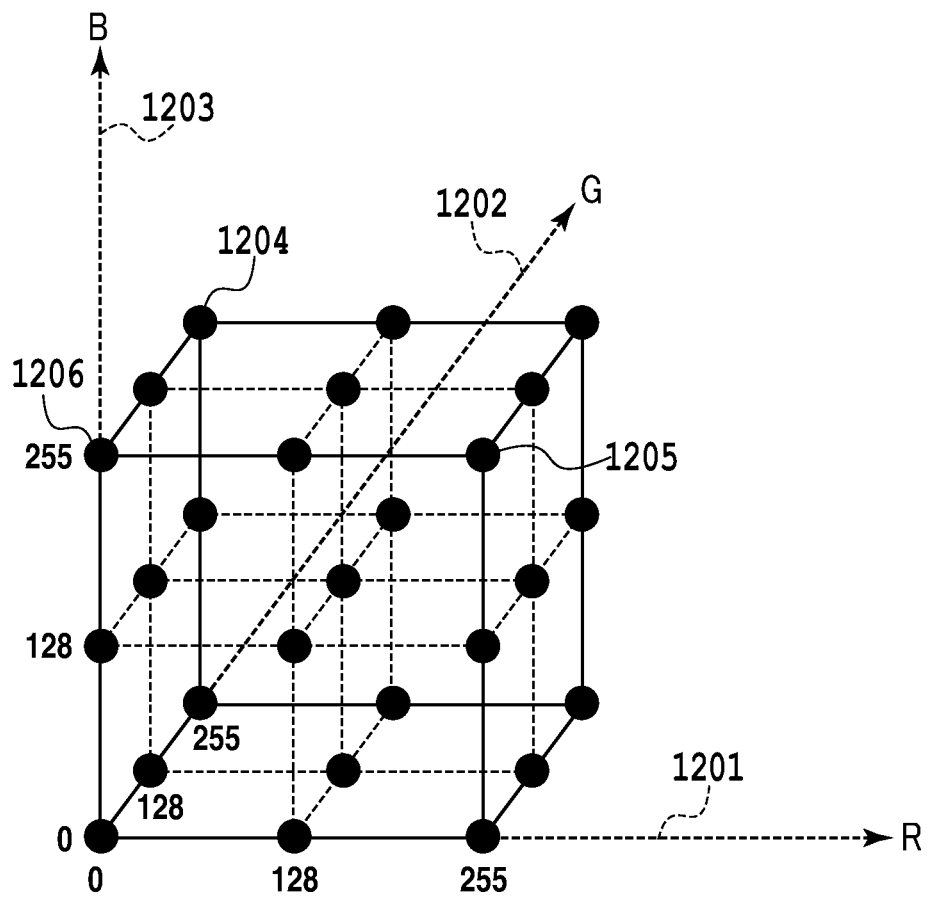
FIG. 18 illustrates lattice points taken at equally spaced coordinates in RGB space.

FIG. 5 is a flowchart for explaining a detection color setting operation (i.e., a first setting operation) executed in collaboration by the CPU 301 of the host apparatus and the CPU 311 of the printing apparatus. When the present process is initiated, in step S601, information regarding colors with noticeable color unevenness (hereinafter referred to as uneven colors) is first received for at least one color from the UI of the host apparatus, and the signal value A (R, G, B) of the uneven color is set. The configuration for setting an uneven color may involve, for example, the user selecting an approximation of the color for which color unevenness is a concern from among a plurality of patches displayed on the UI. In addition, a configuration may also involve the user first selecting a hue for which color unevenness is a concern on the UI. Once the user selects a hue, the UI may display a layout of multiple patches having equivalent hues but different saturations, and prompt the user to select again. Another configuration may involve actually outputting patches for multiple colors corresponding to lattice points in RGB space as illustrated FIG. 18 onto a print medium. The user may then observe the printed results, and input the code of the patch for which color unevenness is a concern from the UI. A selection of 9×9×9 lattice points may be prepared by respectively subdividing the R, G, and B signal values 0 to 255 into nine groups. In so doing, patches for 729 colors can be printed.

In step S602, a three-dimensional LUT prepared in the ink color conversion processor 405 is used to obtain an ink color signal value A (C, M, Y, K) corresponding to the uneven color from the RGB signal value of the color A that was set in step S601.

In the following step S603, several candidate colors are selected from among the lattice points of the ink color conversion table, in the form of signal value combinations that resemble the uneven color A (C, M, Y, K) set in step S602. For example, if the uneven color A (C, M, Y, K)=(100, 120, 0, 0), then the ink colors used are C and M, and lattice points for colors close to the C=100, M=120 combination are selected as candidate colors. At this point, assume by way of example that a candidate color B (C, M, Y, K)=(110, 110, 40, 0) and a candidate color C (C, M, Y, K)=(100, 110, 40, 0) are selected as candidate colors.

Subsequently, in step S604, the similarity is computed between the uneven color A and each of the plurality of candidate colors. Herein, the similarity is not limited too one particular definition, and simply refers to a parameter for indicating the degree to which the combination and ratio of inks used in a given color resemble those of a reference color (i.e., the uneven color A). The similarity can be computed using the following methods, for example.

(1) Averaging the Absolute Differences in Signal Values for Each Ink Color Used in the Uneven Color Over the Number of Inks Used.

For example, in the case of the uneven color A=(100, 120, 0, 0), the candidate color B=(110, 110, 40, 0), and the candidate color C=(100, 110, 40, 0), the number of inks used in the uneven color is two (cyan and magenta). Thus, the similarity b1 of the candidate color B with respect to the uneven color A becomes $$b1=(|110-100|+|110-120|)\div 2=10$$

Meanwhile, the similarity c1 of the candidate color C with respect to the uneven color A becomes $$c1=(|100-100|+|110-120|)\div 2=5$$

In this case, a decreasing similarity can be seen as more closely resembling the uneven color A. In other words, the candidate color C resembles the uneven color A more closely than the candidate color B, and thus can be considered to be as susceptible to color unevenness as the uneven color A.

(2) Averaging the Normalized Signal Values for Each Ink Color Used in the Uneven Color Over the Number of Inks Used For example, in the case of the uneven color. A=(100, 120, 0, 0), the candidate color B=(110, 110, 40, 0), and the candidate color C=(100, 110, 40, 0), the similarity b2 of the candidate color B with respect to the uneven color A becomes $$b2=(|110-100|\div 100+|110-120|\div 120)\div 2=0.092$$

Meanwhile, the similarity c2 of the candidate color C with respect to the uneven color A becomes $$c2=(|100-100|\div 100+|110-120|\div 120)\div 2=0.042$$

When using such a calculation method, the candidate color C still more resembles the uneven color A more closely than the candidate color B, and thus it can be determined that color unevenness is a concern.

However, the similarity computing methods given herein are merely examples, and various other similarity computing methods can be used, such as a method of taking the squared average of the differences in signal values, for example.

Returning to FIG. 5, once the similarity has been computed for each of the plurality of candidate colors in step S604, the process proceeds to step S605, and the one or more candidate colors judged to most closely resemble the uneven color A are selected by comparing the similarities of the plurality of candidate colors. The selected candidate colors and the uneven color are set as detection colors (R, G, B). The process is then terminated.

Figure 6:
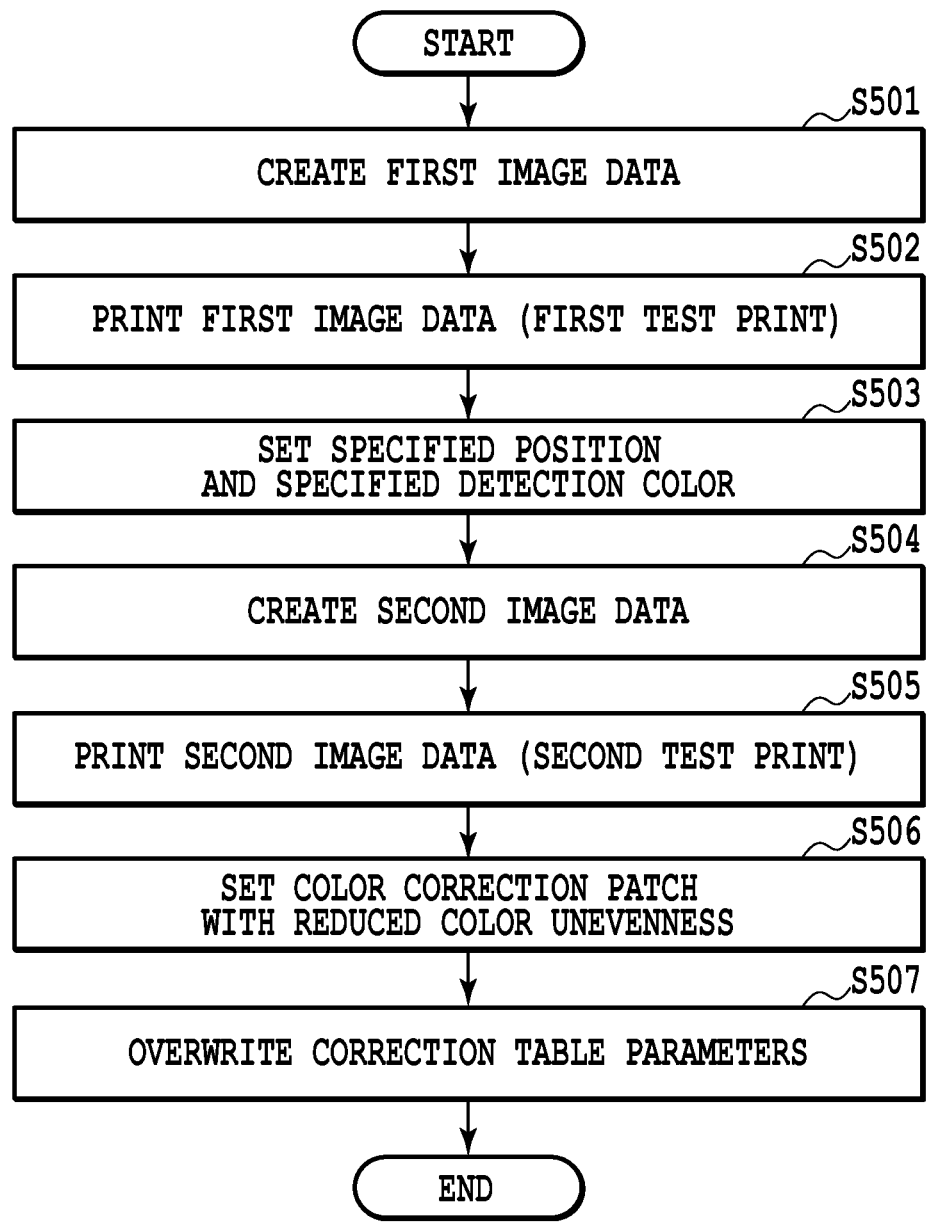
FIG. 6 is a flowchart for explaining a calibration process.
Figure 7A:
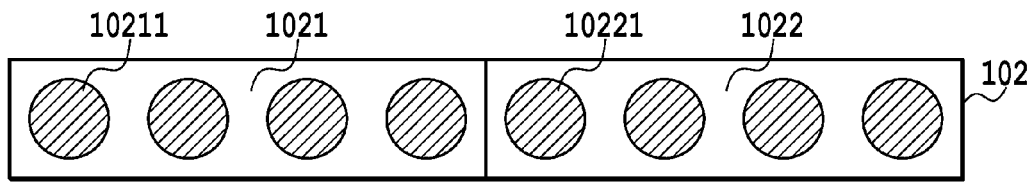
FIGS. 7A to 7D are diagrams explaining color unevenness in a post-HS state.
Figure 7B:
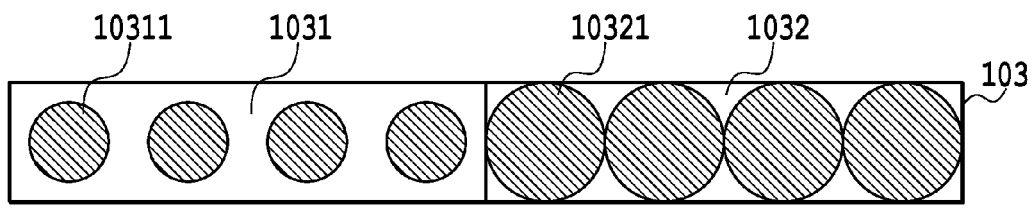
Figure 7C:
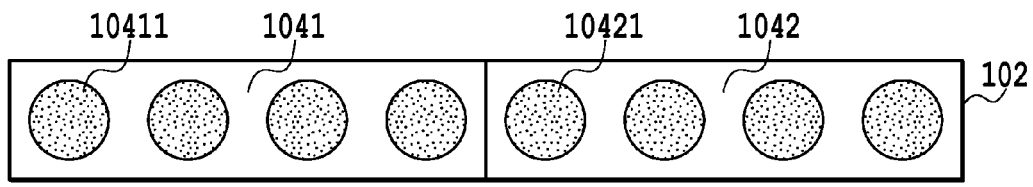
Figure 7D:
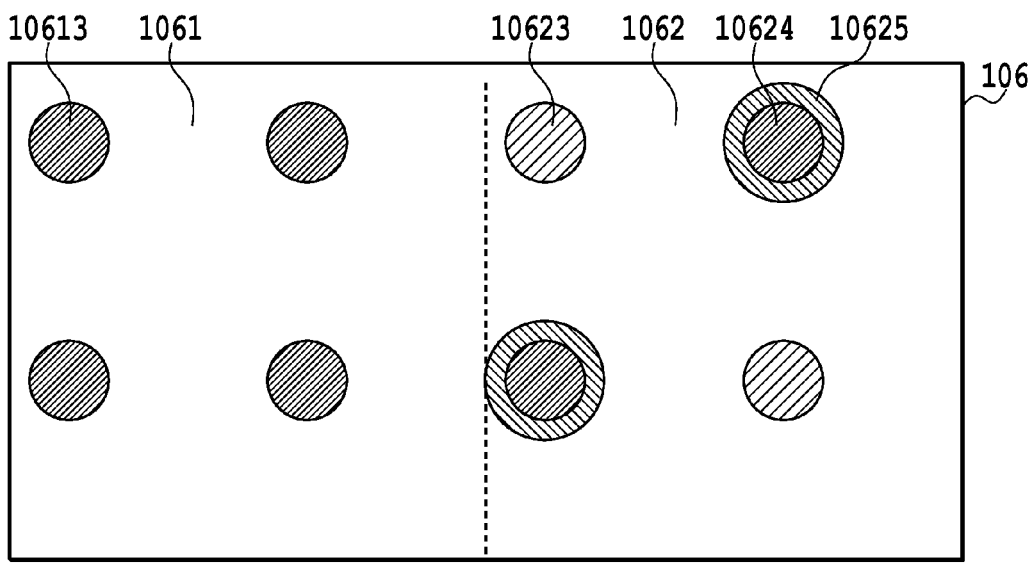
Figure 8A:
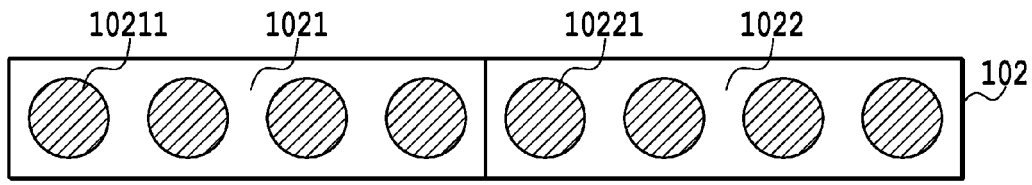
FIGS. 8A to 8D are diagrams explaining color unevenness in a post-HS state.
Figure 8B:
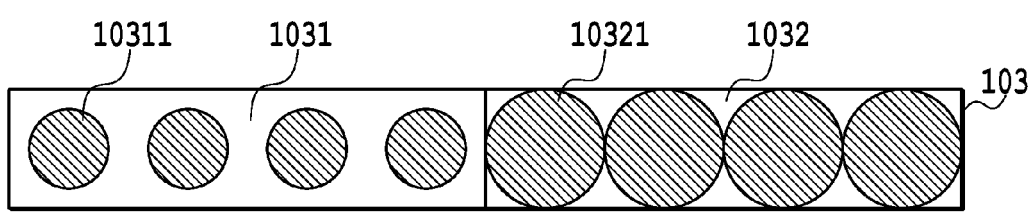
Figure 8C:
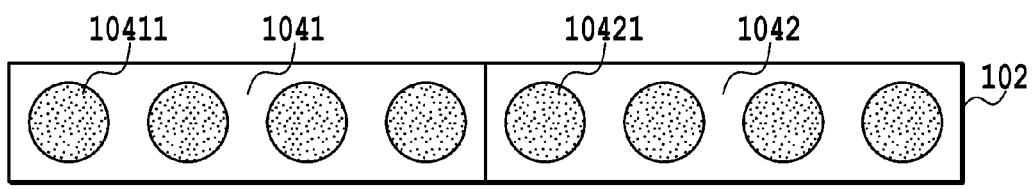
Figure 8D:
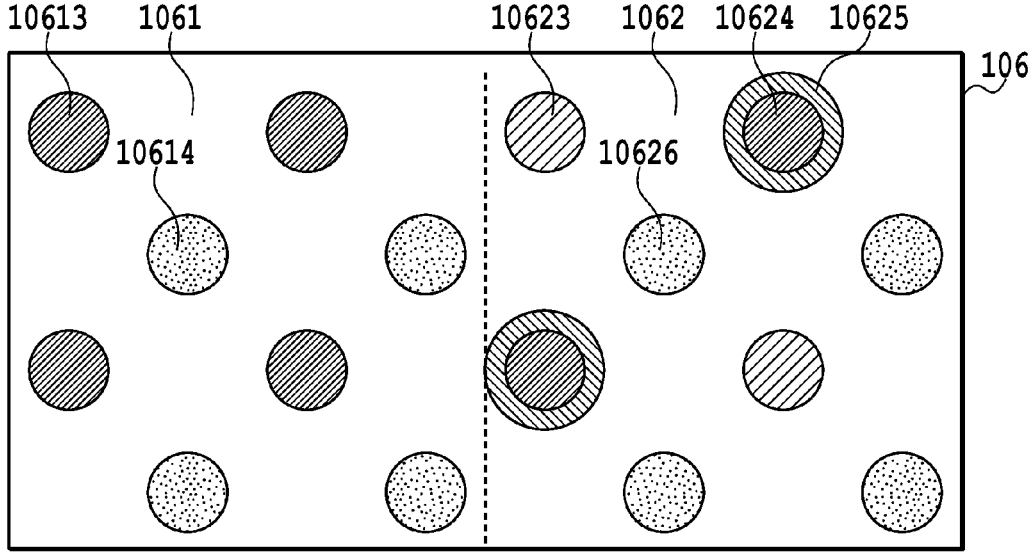
Figure 9A:
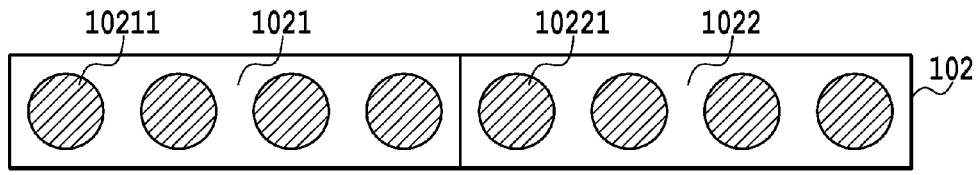
FIGS. 9A to 9D are diagrams explaining color unevenness in a post-HS state.
Figure 9B:
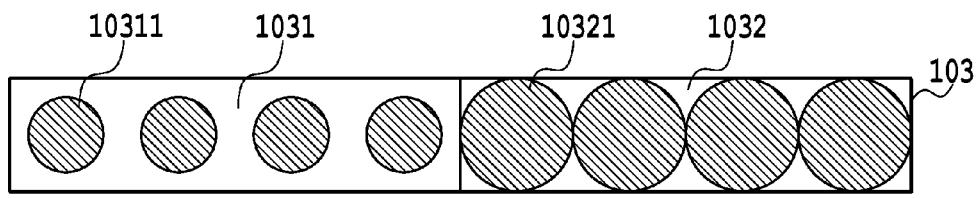
Figure 9C:
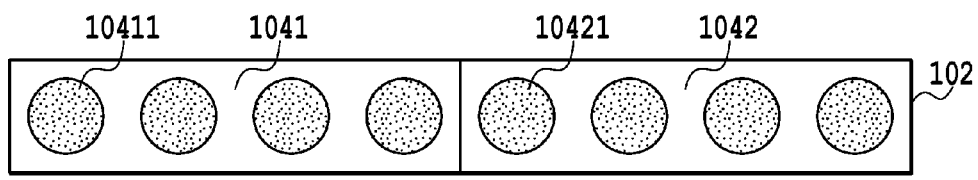
Figure 9D:
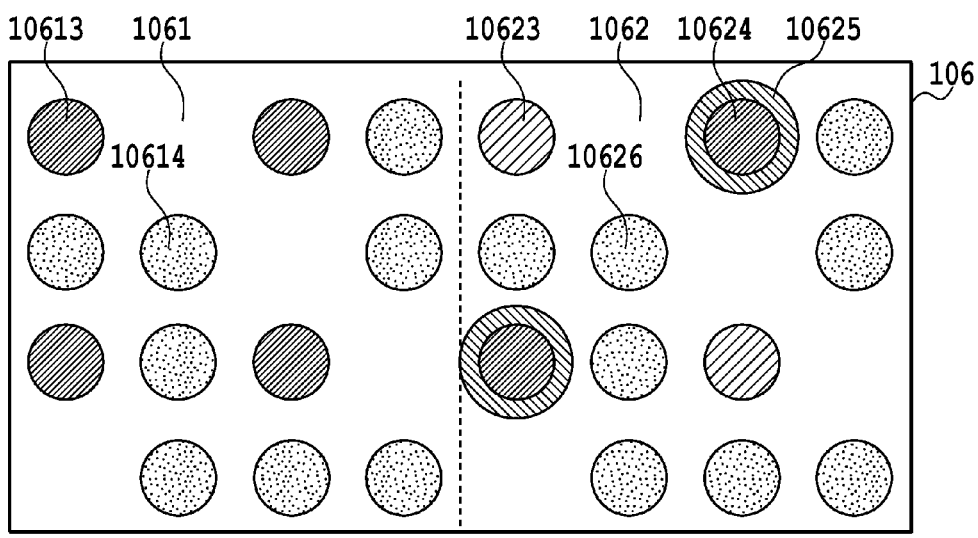
Figure 10A:
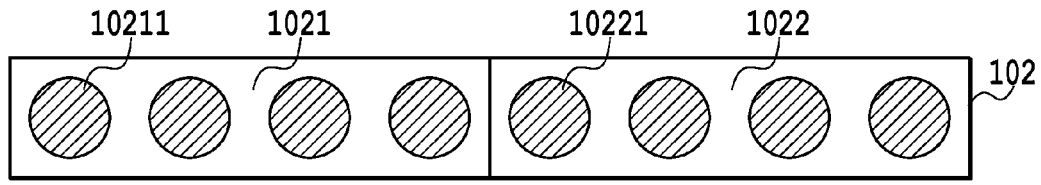
FIGS. 10A to 10D are diagrams explaining color unevenness in a post-HS state.
Figure 10B:
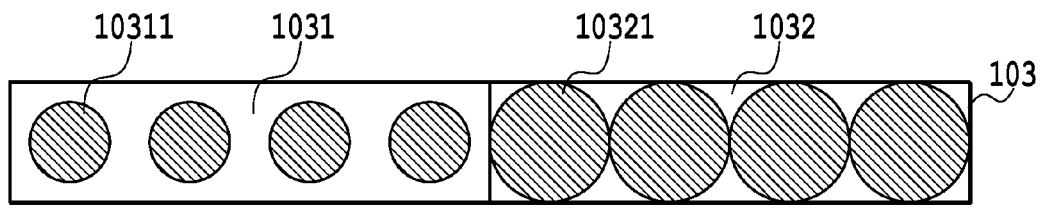
Figure 10C:
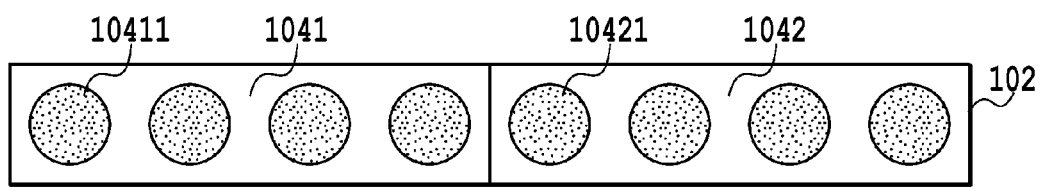
Figure 10D:
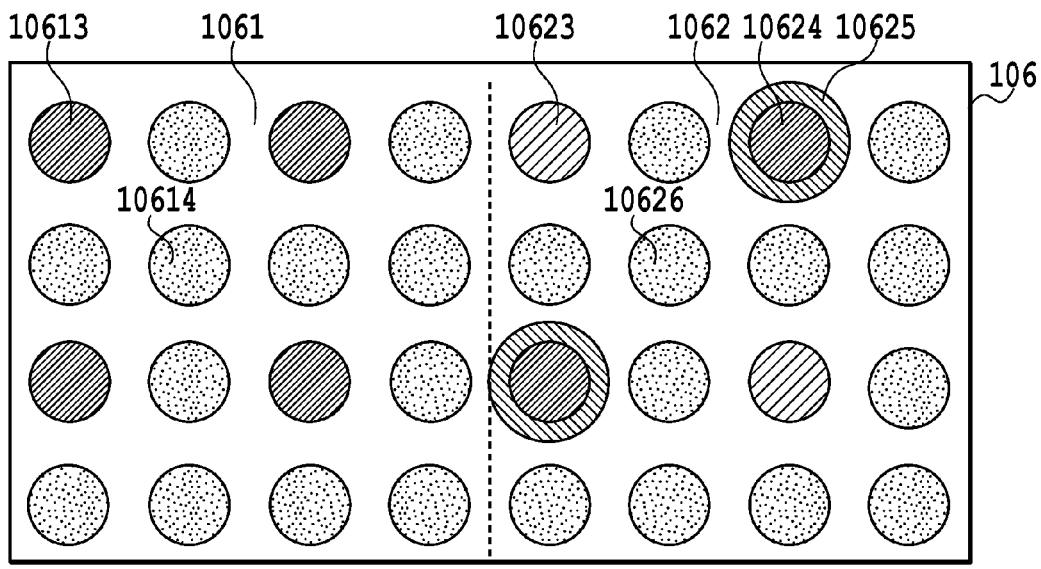
Figure 11A:
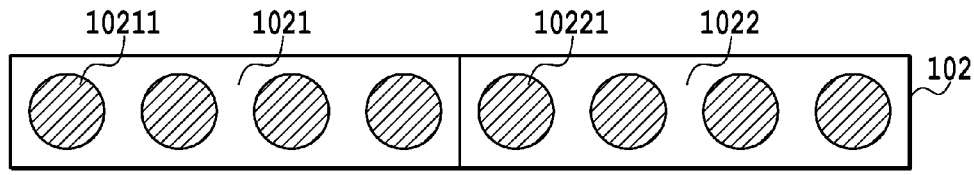
FIGS. 11A to 11D are diagrams explaining color unevenness in a post-HS state.
Figure 11B:
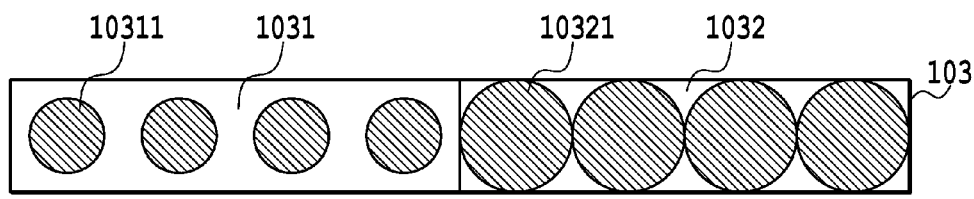
Figure 11C:
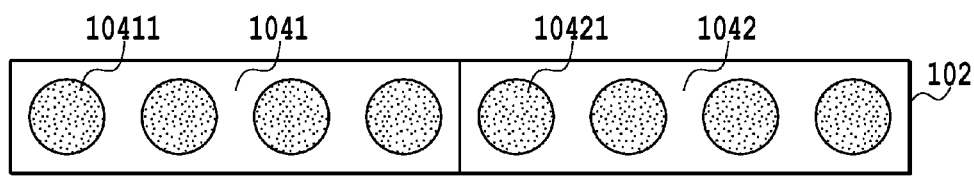
Figure 11D:
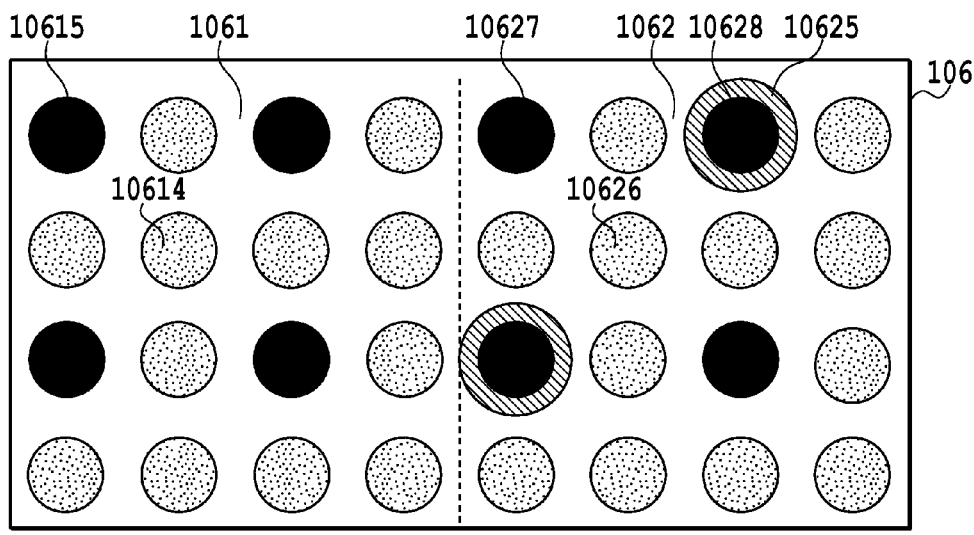

FIG. 6 is a flowchart for explaining a calibration process executed in collaboration by the CPU 301 of the host apparatus and the CPU 311 of the printing apparatus. The calibration process herein refers to a process for correcting the conversion table parameters stored in the three-dimensional LUT referenced by the MCS processor 404. In the present embodiment, the nozzle arrays on each print head are subdivided along the x direction into X nozzle groups of four nozzles each. Additionally, in the MCS processor 404, X correction tables (one for each nozzle group) are prepared so as to convert input data (R, G, B) from the input color conversion processor into suitable correction data (R, G, B). According to such a configuration, even if variations in ejection volume exist among the X nozzle groups, an image that does not exhibit color differences among the nozzle groups can be printed. Herein, in the initial state when calibration has never been conducted, parameters are set in the above correction tables for all nozzle groups such that the input signal values and the output signal values are the same (i.e., the correction tables simply pass the values through).

When the calibration process is initiated, in step S501 the image processor 402 first receives image data (R, G, B) from the input unit 401 for the detection colors that were set by the detection color setting process described with reference to FIG. 5. Various image processing operations are then applied to the received image data. More specifically, after being processed by the input color conversion processor 403, the image data (R, G, B) for the plurality of detection colors is input into the ink color conversion processor 405, without being processed by the MCS processor 404. This path is indicated by the broken line 410 as a bypass path in FIG. 4A. The process by means of this bypass path may also involve inputting the detection color image data into the MCS processor 404, but then outputting the input values as-is due to a table that sets the input values equal to the output values, for example. Subsequently, the detection color image data is processed similarly to ordinary data in the HS processor 406, the TRC processor 407, and the quantization processor 408, and first image data is created (first generation).

In the following step S502, test patterns (the first image) are printed onto a print medium in the output unit 409 in accordance with the obtained binary data. This printing becomes the first test print.

It is herein assumed that the table parameters for the HS processor 406 have already been created by the time of the image processing conducted in the above step S501. For this reason, in the first test print conducted in step S502, variations in the densities expressed on the print medium are suppressed. For example, the number of printed dots may be adjusted such that nozzles with large ejection volumes eject a fewer number of times, and nozzles with small ejection volumes eject a greater number of times.

Figure 12:
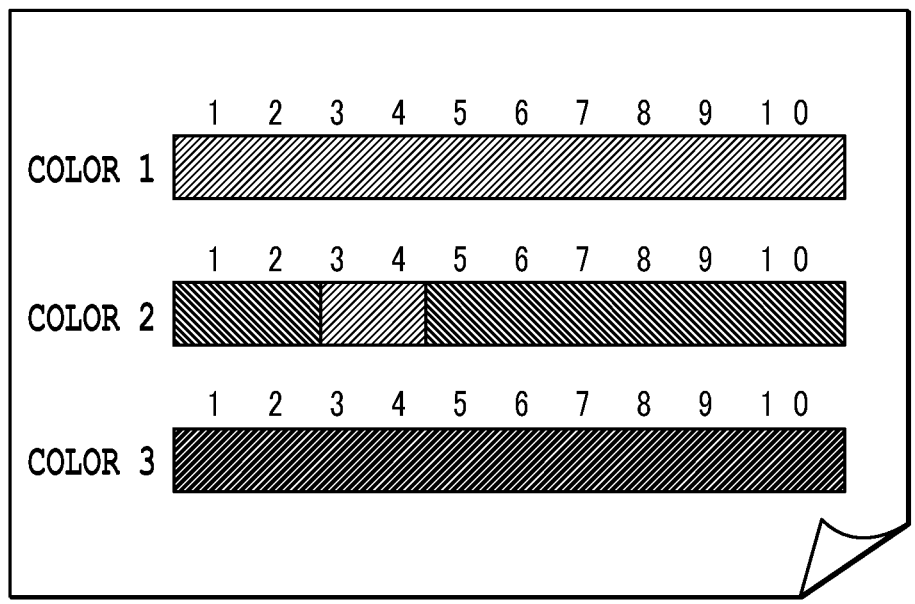
FIG. 12 illustrates a first test print layout.

FIG. 12 illustrates an example of a test pattern printed in the first test print. FIG. 12 illustrates an example wherein three detection colors have been set by the detection color setting operation described with reference to FIG. 5, and wherein three patches corresponding to these three detection colors have been printed in bands. The test pattern is printed while conveying the print medium in the y direction, with each patch having regions that correspond to the width of the nozzle arrays 101 to 104. Near each patch, there have been added identifiers (1 to 10) for associating each region with the nozzle position on the print head that printed that region. The identifiers may be displayed numbers as illustrated in FIG. 12, but may also be a displayed scale or similar reference. FIG. 12 illustrates a state of noticeable color difference compared to other regions near the identifiers 3 and 4 in detection color 2. The user visually checks such a test pattern.

Figure 13:
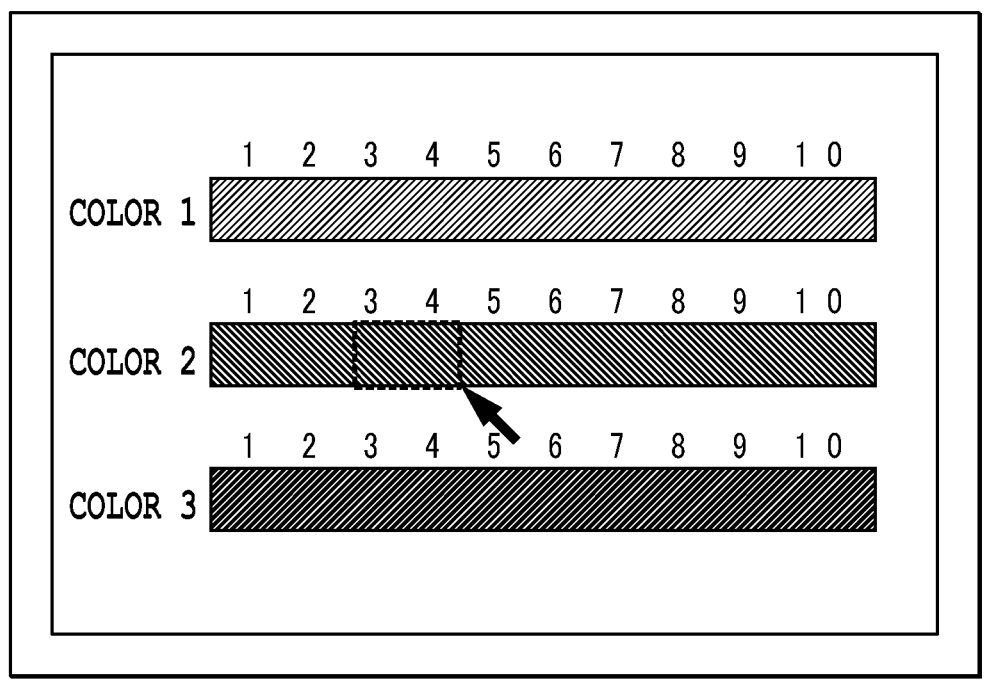
FIG. 13 illustrates a UI screen specifying the position of color unevenness.

Returning to FIG. 6, in step S503, the user inputs a detection color with noticeable color difference and its position from the UI of the host PC. More specifically, an image like that illustrated in FIG. 13 is shown on the UI display, and the user may use a cursor to click the area near the identifier 3, 4 or both ends for the detection color 2. By means of such user input, the CPU 301 of the host apparatus sets the specified position as the position on the print head where color difference occurs, and sets the specified detection color as the color to be corrected with respect to that position (first information acquisition). A plurality of such specified positions and specified detection colors may also be set.

Means may also be provided such that, if there exists a gradient of color difference among the detection color patches, then the position where color difference is most strongly exhibited (i.e., the maximum value position) is selected on the patches in FIG. 13 together with the end positions of color difference. If the end positions and the maximum position of the color difference can be ascertained, then adjustments can be made in the correction process to increase the correction magnitude the most at the maximum value, with the correction magnitude decreasing towards the end positions. Also, it should be appreciated that at the time of the user input, the detection color and the identifiers may be input from the keyboard instead of a cursor like that illustrated in FIG. 13.

In step S504, second image data is created, wherein a plurality of color correction patch data is laid out in accordance with the specified position on the print head and the specified detection color that were set. Color correction patch data refers to image data wherein data for colors slightly different from the specified detection color is set for the specified position set in step S503, and wherein data for the specified detection color is set as-is for all regions other than the specified position. Hereinafter, a method for generating the second image data will be specifically described in further detail.

In the present embodiment, the nozzle arrays on each print head are subdivided along the x direction and managed in X nozzle groups of four nozzles each. Among the X nozzle groups, the color signal D for expressing the color given to the nth nozzle group from the left (where n=1~X) is taken to be D[n]=(R, G, B). Furthermore, assume that the print head position set in the above step S503 (i.e., the specified position) corresponds to the kth nozzle group, and that a detection color 2 (R, G, B)=(10, 10, 100) has been set as the specified detection color. Also, assume that m sets of correction patch data have been prepared in the second image for the above.

At this point, for the nozzle groups where n=1~k−1 and n=k+1~X, the color signals Di[n] (where i=1~m) for the m sets of color correction patch data become Di[n]=D[n]=(0, 0, 255). In contrast, for the nozzle group where n=k, m color correction values Zi[k] are prepared for the color signals Di[k] for the m sets of color correction patch data. For example, when m=6, six color correction values may be prepared: Z1[k]=(10, 0, 0), Z2[k]=(0, 10, 0), Z3[k]=(0, 0, 10), Z4[k]=(−10, 0, 0), Z5[k]=(0, −10, 0), and Z6[k]=(0, 0, −10). These color correction values are all positioned at equal distances from the origin (0, 0, 0). Furthermore, by adding this plurality of color correction values to the respective color signals Di[k], color signals Di[K] are obtained for six sets of color correction patch data. In other words, in the above case, the following color signals are obtained: D1[k]=D[k]+Z1[k]= (20, 10, 100), D2[k]=D[k]+Z2[k]=(10, 20, 100), D3[k]=D[k]+Z3[k]=(10, 10, 110), D4[k]=D[k]+Z4[k]=(0, 10, 100), D5[k]=D[k]+Z5[k]=(10, 0, 100), and D6[k]=D[k]+Z6[k]= (10, 10, 90). These color signals Di[k] are all positioned at equal distances from the color signal D[k] of the specified detection color in RGB color space.

The m Di[k] created in this way are combined with the Di[n] for all cases other than n=k to create m sets of color correction patch data, which are then laid out in the sub-scan direction. By subsequently conducting the entire series of image processing operations illustrated in FIG. 4A except the MCS process, the second image is created (second generation).

It should be appreciated that the distances from the origin to the color correction values Zi[k] are not necessarily uniform, and may be adjusted according to value of the color signal D[n]. For example, distances may be decreased to less than that of the color correction values Zi[n] near the color gray, since the human eye is able to precisely distinguish color differences among gray hues.

Additionally, the magnitude of the color correction values Zi[n] may also be changed according to the nozzle positions on the print heads. In some cases, the noticeability of color unevenness on a print head differs according to the nozzle position. For example, if a print head for a single color is formed by joining a plurality of tips along the x direction, severe color unevenness can occur at the positions of the joints between tips. In such cases, strong color unevenness can be accommodated by increasing the magnitude of the color correction values Zi[k] at the positions of the joints between tips compared to other regions.

Returning again to the flowchart in FIG. 6, in step S505, the second image that was created in step S504 is printed. This printing becomes the second test print.

Figure 14:
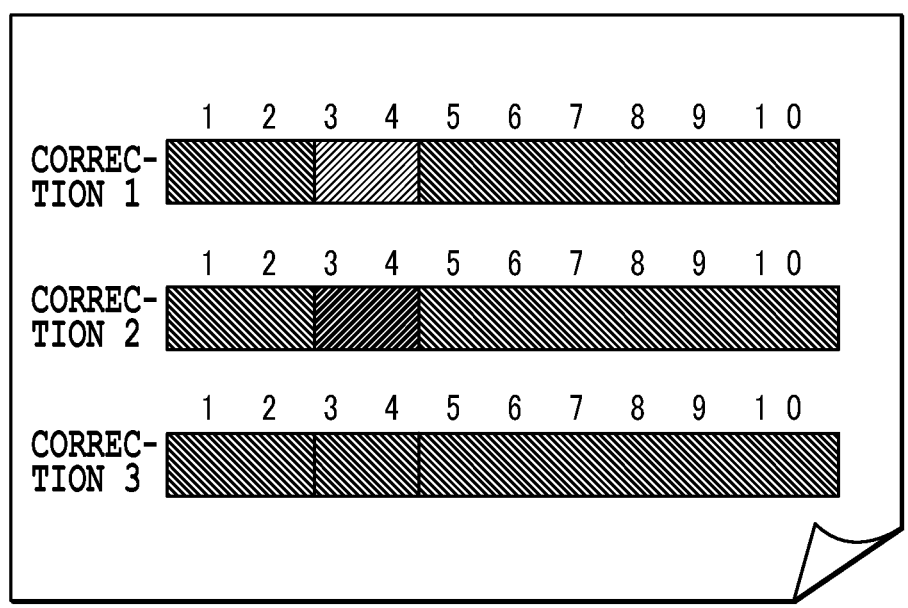
FIG. 14 illustrates a second test print layout.

FIG. 14 illustrates an example of test patterns printed in the second test print. Herein, three sets of color correction patch data have been printed in bands. Similarly to the first test print, identifiers (1 to 10) for associating each region with the nozzle position on the print head that printed that region have been added near each patch. The user visually checks the output test patterns, and selects the color correction patch data where the color unevenness has been reduced the most. In the example illustrated in FIG. 14, the color correction patch labeled Correction 3 has been most favorably corrected. In step S505, the pattern that was printed in the first test print and set as the detection color to be corrected may also be arranged and printed alongside the above plurality of correction patches. In so doing, the user is able to confirm the correction's effectiveness by comparing the color-corrected patches to the non-color corrected patch. Also, if the user is having difficulty choosing between two color correction patches, he or she will be able to make a more correct choice by comparing the color correction patches to a patch that has not been subjected to the color correction process.

Figure 15:
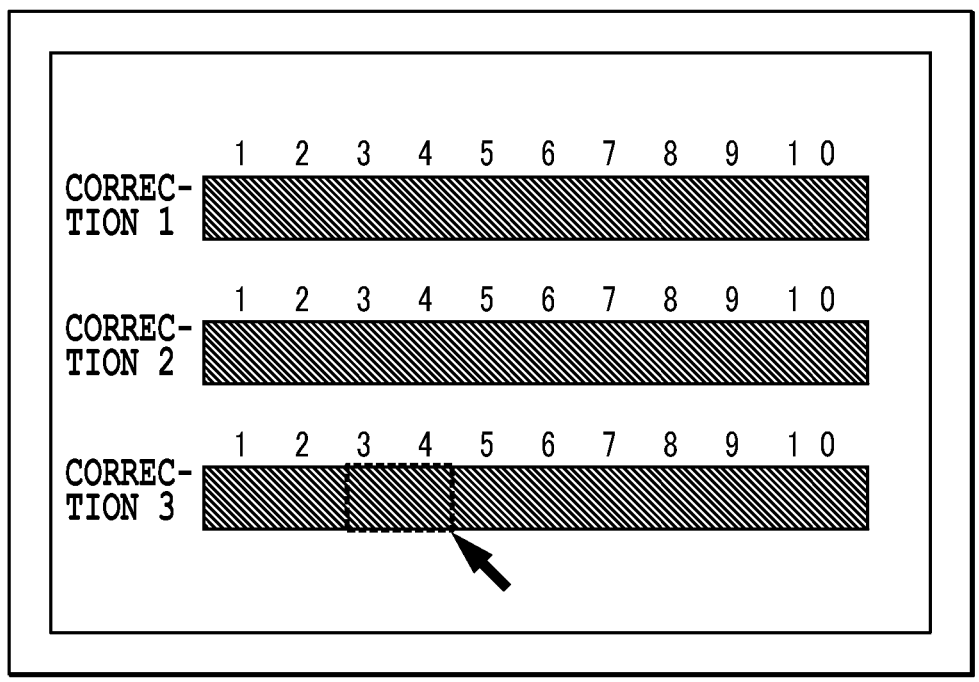
FIG. 15 illustrates a UI screen specifying a correction patch with improved color evenness.

In step S506, the user selects the color correction patch with the most-improved color unevenness from the UI of the host PC (second information acquisition). More specifically, a screen like that illustrated in FIG. 15 may be shown in the UI display, and the user may use a cursor to click the color correction patch labeled Correction 3. At this point, if there are two color correction patches with the same degree of reduced color unevenness, the user may specify those two patches.

In step S507, the contents of the three-dimensional LUT referenced by the MCS processor 404 for the nozzle group is corrected according to the color correction values of the color correction patch specified in step S506. The number of prepared three-dimensional LUTs (i.e., color conversion tables) for reference during the MCS process is equal to the number of nozzle groups (i.e., X), thereby enabling color correction conversion with respect to each individual nozzle group. In color conversion tables that have yet to be corrected, as well as color conversion tables for nozzle groups that do not particularly require correction, the input signal values (R, G, B) and the output signal values (R, G, B) are equal values. In the present embodiment, the parameters of the correction table corresponding to the nozzle group k are rewritten according to the color correction values Zi[k] for the color correction patch that was specified in step S506, such that the first color signal D[k] input into the nozzle group k is converted into the second color signal D3[k]. For example, for the case where the color correction value Zi[k] is Z3[k]=(0, 0, 10), the conversion table parameters corresponding to the nozzle group k will be rewritten such that the first color signal D[k]=(10, 10, 100) is converted to the second color signal D3[k]=(10, 10, 110). A method may also be used wherein these parameters are formed and stored separately from the correction table, without rewriting the conversion table parameters of the correction table.

If two color correction patches are specified in step S506, then output signal values may be created by taking the average of two color correction values Zi[k]. More specifically, in the case where the first color correction value Zi[k] is (0, 0, 10) and the second color correction value Zj[k] is (0, 10, 0), the averaged color correction value Z[k]=(0, 5, 5) may be used as the color correction value to set the second color signal (10, 15, 105). Once the three-dimensional LUTs corresponding to the individual nozzle groups are corrected by means of the process described above, the calibration process is terminated.

The calibration process described above may be forcibly or selectively executed during the manufacturing of the printing apparatus, once the printing apparatus has been used for a predetermined amount of time, or once a predetermined printing volume has been conducted. Alternatively, the calibration process may be executed before each printing operation. When user observes actually output images and concerns color unevenness, he or she may arbitrarily the process starting from the detection color setting operation described in FIG. 5.

When actual printing is conducted after terminating the calibration process, the input image data is subjected to the series of image processing operations illustrated in FIG. 4A, and printed onto a print medium. At this point, signal value conversion for correcting color difference may be conducted by the MCS processor with respect to nozzle groups for which color difference due to ejection volume variation is a concern. Thus, it becomes possible to output uniform images without color unevenness.

Figure 16A:
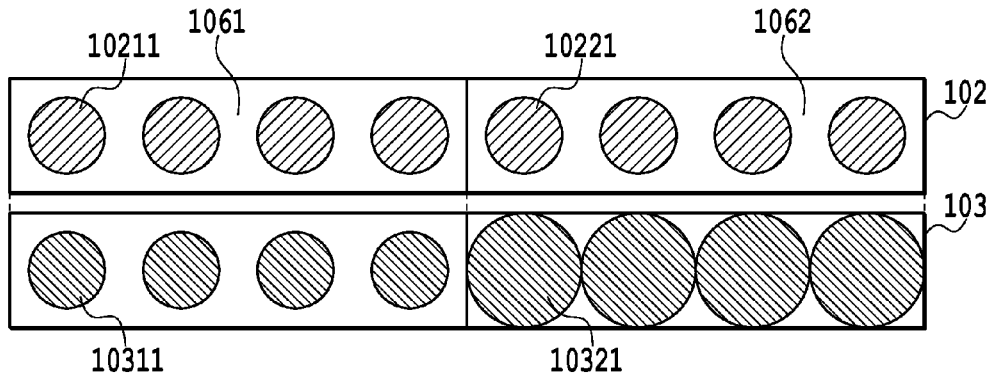
FIGS. 16A and 16B illustrate the printed state of dots in a blue image printed before a calibration process.
Figure 16B:
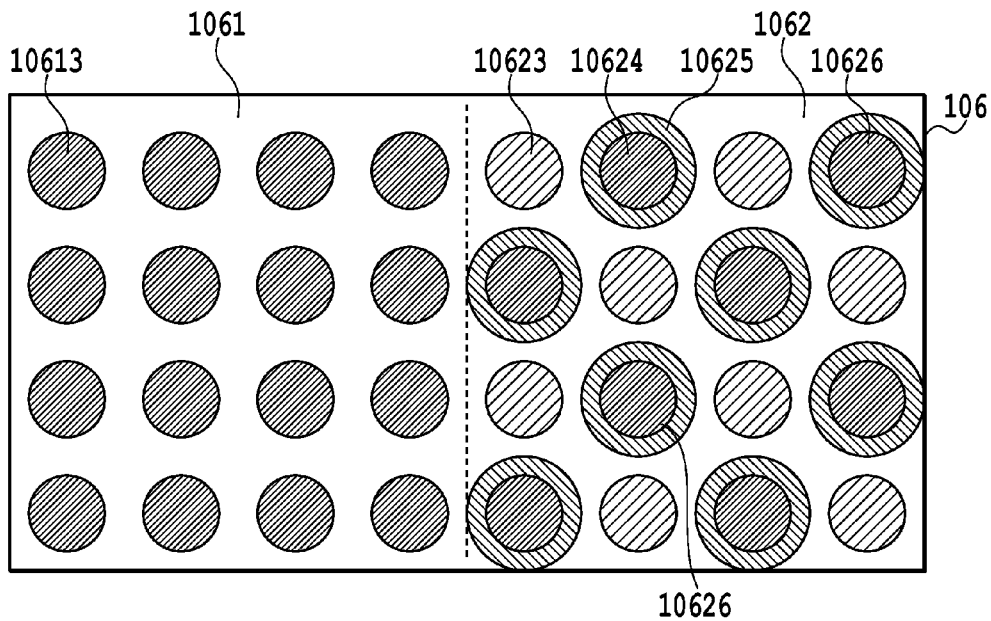
Figure 17A:
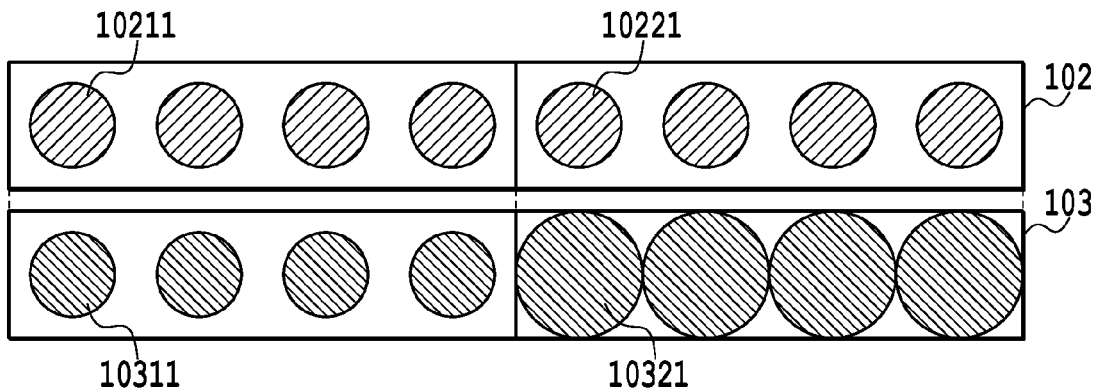
FIGS. 17A and 17B illustrate the printed state of dots in a blue image printed after a calibration process.
Figure 17B:
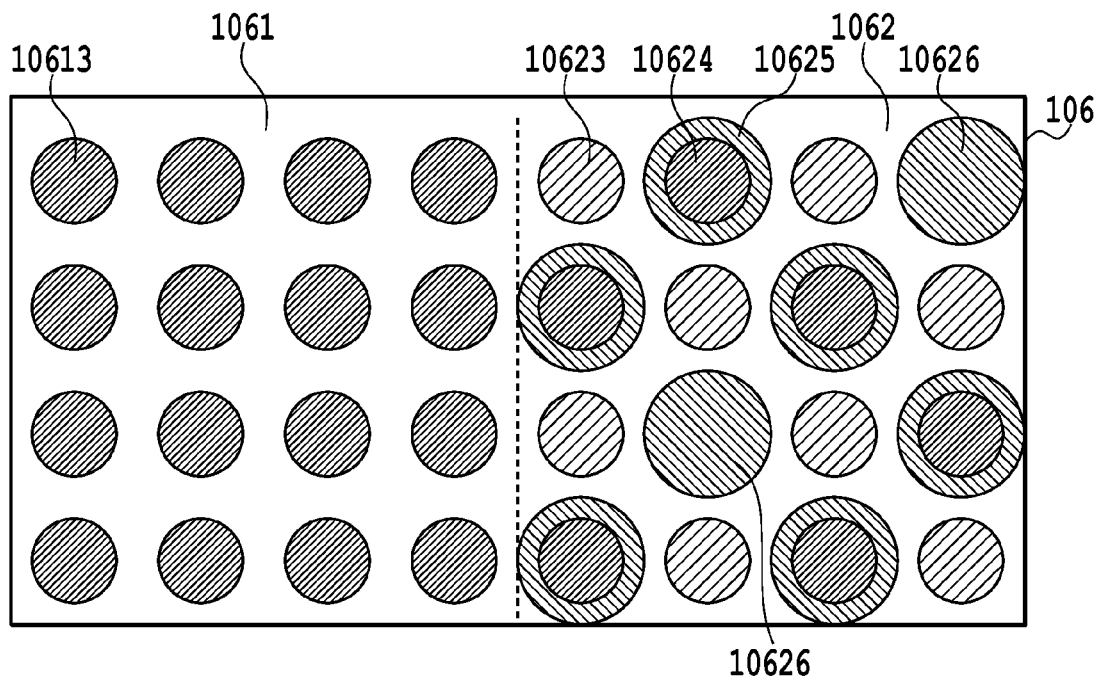

FIGS. 16A and 16B illustrate the printed state of dots in a blue image printed before a calibration process (i.e., in the state where only the HS process and not the MCS process has been conducted). In contrast, FIGS. 17A and 17B illustrate the blue image printed after the calibration process, for comparison with FIGS. 16A and 16B. In all of the above drawings, print heads identical to those described in FIGS. 3A to 3C are used.

Similarly to FIG. 3C, in the printed state illustrated in FIG. 16B, the color observed as a result of the combination of the light absorption characteristic of the cyan areas 10623 with the light absorption characteristic of the magenta area 10625 is not necessarily equivalent to the color observed as a result of the light absorption characteristic of the blue areas 10624. In this case, the user perceives the second area to exhibit a stronger cyan color compared to the first area. The user then specifies an uneven color in order to correct the color unevenness of the first area and second area, and the series of calibration processes described earlier are executed. In so doing, the blue image in the second area exhibits a printed state like that illustrated in FIG. 17B. FIG. 17B demonstrates that the number of cyan dots 10624 has been decreased, and the cyan tone has been suppressed compared to FIG. 16B. As a result, the color in the second color is closer to the color in the first area, and the color unevenness is reduced.

As described above, the present embodiment involves printing a first image onto a print medium and presenting a color with noticeable color unevenness, as well as similar colors. The user then specifies a color and a nozzle position where color unevenness has occurred. On the basis of these results, parameters are set for a correction table referenced by an MCS processor. In so doing, it becomes possible to address the factor causing the color unevenness, and mitigate the effects of color unevenness in a focused way without incurring increases in processor load, memory requirements, or processing time as compared to the case of calibrating all lattice points.

By way of example, the foregoing describes the case wherein four magenta nozzles included in the same nozzle group all exhibit greater-than-standard ejection volumes. However, it is highly plausible that respective nozzles in a single nozzle group will exhibit varied and divergent ejection characteristics. Even in such cases, suitable parameters can be set from the average color difference in the same nozzle group, and color difference can be corrected by means of all four nozzles. By configuring an embodiment in this way, advantages similar to the results described earlier can be obtained.

Also, in step S506 of the above calibration process, it is conceivable for the user to determine that the color unevenness has not been sufficiently reduced in any of the color correction patches. In such cases, the user may select at least one color correction patch where the color unevenness has been reduced the most, and additionally issue instructions to conduct the second test print again on the basis of that color correction patch. In other words, the process returns again to step S504, color signals Di[k] to which a plurality of color correction values Zi[k] have been added are again generated about the color correction patch selected as a reference, and the generated results may be printed as a third image. At this time, the color correction values Zi[k] used to generate the third image may also be modified from the color correction values Zi[k] used to generate the second image.

For example, if the color unevenness was over-corrected in the first correction, then the color values Zi[k] used to generate the third image may be decreased. In so doing, finer correction can be conducted and more closely approach a position with less color difference. Furthermore, by repeating such operations, the correction can by stages converge on the target position with the least color unevenness. In contrast, if the color unevenness was under-corrected in the first correction, then the first correction can be redone using increased color correction values $Z_i[k]$.

Variation 1

FIG. 4B is a block diagram illustrating another exemplary configuration of an image processor in an inkjet printer in accordance with the present embodiment. In FIG. 4B, the respective units indicated by the reference symbols 401 and 405 to 409 are identical to each of the units indicated by the same reference symbols in FIG. 4A, and thus further description of such units is herein omitted. The present variation differs from the configuration illustrated in FIG. 4A in that the processes executed by the input color conversion processor and the MCS processor have been configured as a single processing unit. In other words, the input color conversion processor & MCS processor 411 in the present variation is a processing unit that combines the functions of an input color conversion processor and an MCS processor.

More specifically, the input color conversion processor & MCS processor 411 involves the use of a table that combines the table of an input color conversion processor with the table of an MCS processor. That is, the input color conversion processor & MCS processor 411 includes a plurality of different three-dimensional LUTs for each nozzle group. In addition, the input color conversion processor & MCS processor 411 directly corrects color unevenness with respect to input image data from the input unit 401, and outputs RGB image data that differs for each nozzle group.

Figure 20:
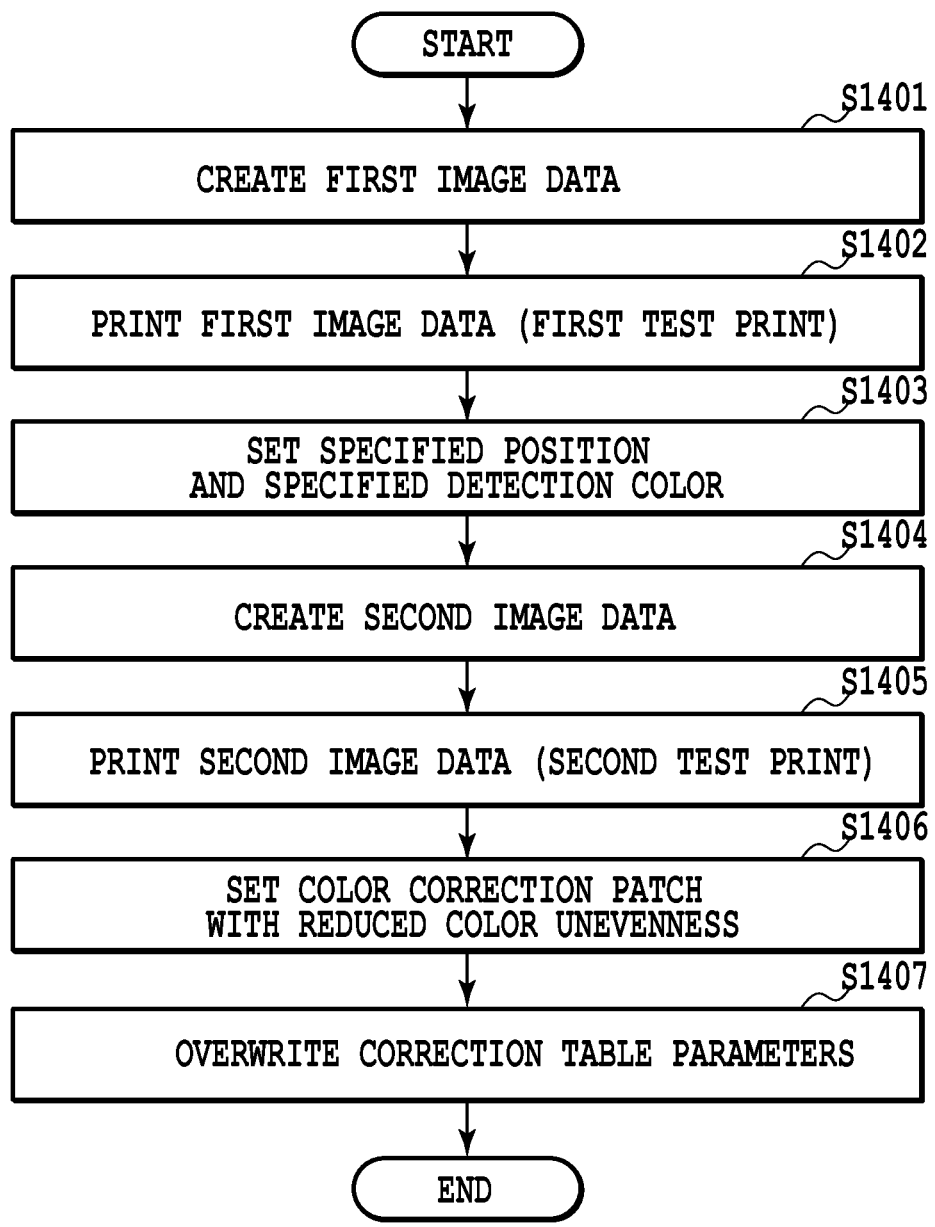
FIG. 20 is a flowchart explaining a calibration process of Variation 1.

FIG. 20 is a flowchart that illustrates steps of the calibration process in Variation 1. The flowchart in FIG. 20 differs from the flowchart in FIG. 5 with regard to the processing in step S1401 and step S1404.

In step S1401, received detection color image data is directly input into the ink color conversion processor 405. This path is indicated by the broken line 410 as a bypass path in FIG. 4B. Subsequently, processing similar to that of normal data is performed by the HS processor 406, the TRC processor 407, and the quantization processor 408.

Step S1404 is similar. The second image is created by laying out a plurality of color correction patch data in the sub-scan direction, and subjecting the results to the entire series of image processing operations illustrated in FIG. 4A, except those of the input color conversion processor & MCS processor 411.

According to the above Variation 1, since the same processing as in the first embodiment is conducted by using a LUT composited by the input color conversion processor & MSS processor 411, color unevenness can be reduced similarly to the first embodiment. Furthermore, since data is batch converted using a single LUT, it becomes possible to decrease the memory area reserved for the LUT to less than that of the first embodiment, and improve processing speed.

Variation 2

FIG. 4C is a block diagram illustrating a configuration of an image processor in accordance with Variation 2. In FIG. 4C, the respective units indicated by the reference symbols 401 and 405 to 409 are identical to each of the units indicated by the same reference symbols n FIG. 4A, and thus further description of such units is herein omitted. The present variation differs from the configuration illustrated in FIG. 4A in that the order of the input color conversion processor 403 and the MCS processor 404 has been reversed.

According to the above Variation 2, color unevenness can be reduced similarly to the first embodiment. In addition, by positioning the MCS processor at the front of the image processor, the MCS processor 404 can be provided as an expansion module for an image processor that is not equipped with an MCS processor, for example. Furthermore, it also becomes possible to shift processing over to the host PC.

Variation 3

FIG. 4D is a block diagram illustrating a configuration of an image processor in accordance with Variation 3. As illustrated in FIG. 4D, the present variation omits the HS processor 406 provided in FIGS. 4A to 4C.

The calibration process in the present variation is the same as the flowchart in FIG. 5, and differs only in that the HS processor is not independently provided. In other words, in the present variation, density unevenness for first colors is corrected simultaneously with color unevenness in the MCS processor. Thus, when executing the calibration process, the HS process is not conducted in advance, and the correction tables are not created on the basis of HS-processed data.

Figure 21A:
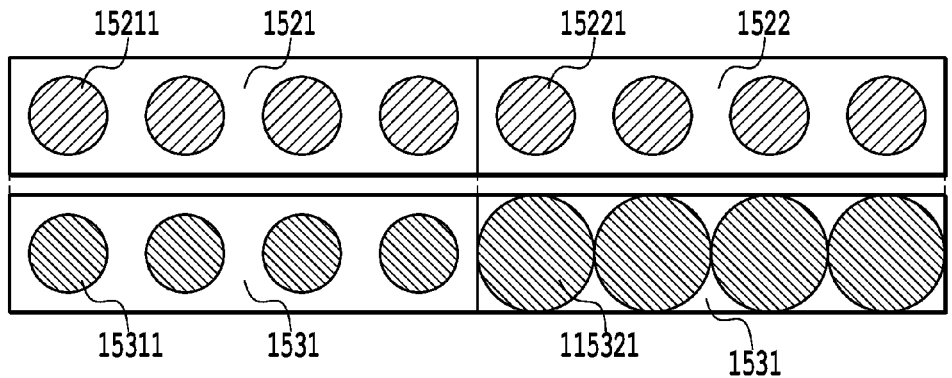
FIGS. 21A and 21B illustrate the printed state of dots in a blue image printed before a calibration process.
Figure 21B:
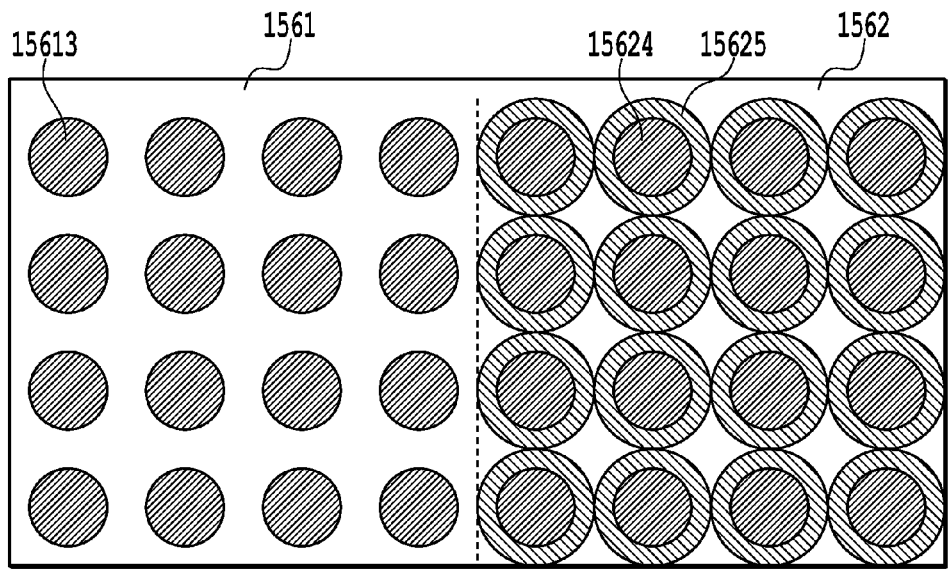

FIGS. 21A and 21B illustrate the printed state of dots in a blue image printed before the calibration process in the present variation (i.e., in a state where neither the HS process nor the MCS process has been conducted). In the present variation, such patterns are printed in the first test print. FIG. 21A illustrates an example wherein the four nozzles corresponding to the second area among the nozzles of the magenta print head exhibit greater-than-standard ejection volumes, similarly to the example illustrated in FIG. 3A. In the present variation, since an HS process is not performed with respect to image data expressing blue (K, C, M, Y)=(0, 255, 255, 0) a blue measurement image like that illustrated in FIG. 21B is printed. In other words, the same numbers of magenta dots and cyan dots are printed, even when the second area contains nozzles with greater-than-standard ejection volumes. As a result, in the second area, color difference occurs closer to magenta. In the present variation, such a test print can be used as a basis for conducting a calibration process and obtaining advantages similar to those of the foregoing embodiment.

In the present variation not provided with an HS processor, it becomes unnecessary to prepare tables for HS processing, and operations for HS processing, such as printing patterns, measuring color, and calculating correction parameters, also become unnecessary. As a result, it becomes possible to reduce memory usage and reduce time costs related to HS processing.

In the embodiment and variations described in the foregoing, four nozzles are taken to constitute one nozzle group, which is set as the minimum unit for conducting MCS processing. However, it should be obvious that the present invention is not limited to such units. A single nozzle group may contain a greater number of nozzles, or MCS correction may be conducted on a per-nozzle basis. Furthermore, it is not strictly necessary for individual nozzle groups to contain equal numbers of nozzles, and the numbers of nozzles contained in individual nozzle groups may be appropriately set according to the conditions of color unevenness.

It should also be appreciated that the color reproduction range expressible by a printing apparatus differs according to the type of print medium. Even when printing with the same types and numbers of ink droplets, the colors and densities expressed on a print medium will change according to the type of print medium. Thus, among the image processing units illustrated in FIGS. 4A to 4D, the input color conversion processor 403, the MCS processor 404, the ink color conversion processor 405, the HS processor, and the TRC processor will preferably be provided with tables to reference that have been separately prepared for each print medium. In this case, it becomes necessary to prepare a great number of one-dimensional or three-dimensional tables, but these tables can still be stored in the ROM 313 of the printing apparatus even when the primary image processor is the host PC. Additionally, the user may set the type of print medium to be used from the UI of the host apparatus at the time of conducting the calibration process for the HS processor and the MCS processor, or at the time of actual printing. By setting the type of print medium, just the tables necessary for image processing can be called by the CPU 301 of the host PC, and the series of image processing operations can be conducted with the tables temporarily stored in RAM.

The foregoing describes printing a test pattern by bypassing the MOS processor when executing a calibration process. However, when executing calibration for the second and subsequent times, for example, test patterns may be printed by following normal data routes. Since the second and subsequent calibrations are conducted in order to correct color unevenness in the current correction tables, test patterns may be printed by subjecting data to the MCS processor and not a bypass route, and suitable color correction values $Z_i[k]$ may be added to the current parameters.

Furthermore, in the foregoing embodiment, image is described, by way of example, as being input in RGB format, subjected to MCS and other processing, and then converted into CMYK format image data compatible with the ink colors used in the printing apparatus. However, the present invention is not limited to such formats. Besides the RGB format, the image data subjected to MCS processing may be in $L^*a^*b^*$, Luv, LCbCr, or LCH format, for example. In addition, since actual color unevenness is determined by combinations of CMYK inks, the MCS processor may be provided after the ink color conversion processor, and respective CMYK signal values may be output according to combinations of CMYK data. In this case, the correction table referenced by the MCS processor becomes a four-dimensional LUT prepared for each nozzle group.

However, executing MCS processing with respect to RGB data equivalent to the input signal as in the foregoing embodiment has the following merits compared to the case of processing CMYK (i.e., ink color) data.

A first merit is that the data size can be reduced compared to the case of processing CMYK. In the case of conducting MCS processing with CMYK, a four-dimensional LUT must be prepared for each nozzle group as described above. Additionally, current inkjet printing apparatus additionally use more inks such as light cyan (Lc) and light magenta (Lm) in some cases, and thus the use of N inks would necessitate an N-dimensional LUT. In other words, if the MCS processing is conducted with signal values corresponding to the ink colors that are actually used, the processing time as well as the memory required for the correction tables become extremely large.

A second merit is that ink application amount is difficult to exceed the ink amount limit with respect to a print medium compared to the case of processing CMYK. Each type of print medium has a limit to the amount of ink it can absorb, and the ink color conversion processor outputs CMYK data within a range that does not exceed that limit. However, if MCS processing is performed after the ink color conversion processor, then the signal values may be increased, depending on the signal values which are corrected. In other words, ink application amount might increase in some cases. In such cases, the user's hands or the internals of the printing apparatus may even become dirty as a result of ink that is incompletely absorbed by the print medium. In contrast, if the MCS processing is conducted before the ink color conversion processor as in the present embodiment, then the output signals from the ink color conversion processor will be contained within a range that does not exceed the ink amount limit with respect to the print medium, no matter what RGB combinations are produced by the conversions in the MCS processor.

Figure 19:
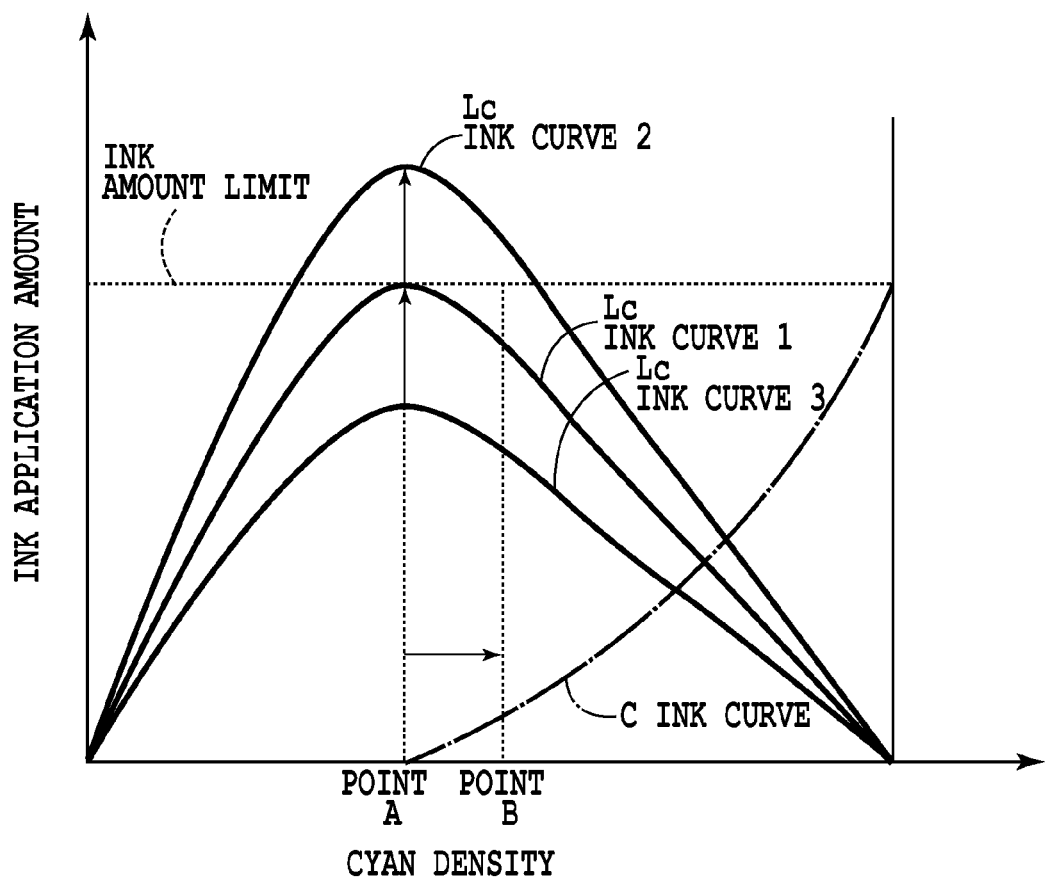
FIG. 19 illustrates cyan hues and ink ejection volumes.

A third merit is that graininess is less likely to worsen in systems that use dark ink and light ink. In systems that use dark ink and light ink, such as cyan ink and light cyan ink, the relationship between the cyan input signal value and the ink application amount to the print medium typically becomes like that illustrated in FIG. 19. In other words, since the graininess of light cyan ink is less noticeable, light cyan ink is used in the low-density region, with the application amount of light cyan ink being increased up to medium-density regions. Once the application amount of light cyan ink nears the ink amount limit with respect to the print medium, the application amount of cyan ink is gradually increased, while the application amount of light cyan ink is decreased. In this way, cyan ink with its more noticeable graininess is gradually printed onto a print medium that has been filled with light cyan ink. In so doing, smooth tone reproduction can be achieved, without making the graininess of cyan ink noticeable.

However, if MCS processing is conducted with signal values that correspond to ink colors, the application amount of light cyan ink might increase in some cases, and decrease in other cases. In other words, in some cases, the application amount of light cyan ink as expressed by the pre-correction Lc curve 1 in FIG. 19 might be increased and become the Lc curve 2 as a result of MCS processing. In this case, as described earlier with regard to the second merit, the ink amount limit with respect to the print medium might be exceeded. In contrast, in some cases, the application amount of light cyan ink as expressed by the pre-correction Lc curve 1 might be decreased and become the Lc curve 3 as a result of MCS processing. In this case, the application amount of light cyan ink is insufficient in the medium-density vicinity where the noticeably grainy cyan ink is gradually printed. For this reason, the graininess of the cyan ink might worsen. However, if MCS processing is conducted with RGB signals as in the foregoing embodiment, then the correction will displace the cyan density itself from point A to point B in FIG. 19, for example. For this reason, the ink application amount will not exceed the ink amount limit with respect to the print medium, nor will the graininess of cyan ink be noticeable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-225750, filed Oct. 5, 2010, which is hereby incorporated by reference herein in its entirety.

What is claimed is:

1. An image processing apparatus which processes color signals as part of a process for converting input image data into color signals corresponding to ink of plural colors, for the purpose of printing an image onto a print medium by using print heads, upon which a plurality of nozzle arrays for ejecting the ink of plural colors are arranged, the image processing apparatus comprising:

a converting unit configured to convert the input image data by using conversion table parameters associated with positions of nozzles on the print heads;

a first setting unit configured to set a color formed by the overlap of ink for at least two colors;

a first generating unit configured to set a plurality of detection colors on the basis of the color set by the first setting unit, and generate first image data made up of patches of the plurality of detection colors;

a first test printing unit configured to print an image of the first image data by using the print heads;

a first information acquiring unit configured to acquire information regarding:

a specified detection color from among the plurality of detection colors in the image printed by the first test printing unit, wherein the specified detection color has been confirmed to exhibit color unevenness due to variations in ejection characteristics among the plurality of nozzles, and a specified position specified as the position of nozzles on the print heads where the color unevenness was confirmed;

a second generating unit configured to generate second image data made up of a plurality of color correction patches in which the specified detection color is set for all nozzle positions other than the specified position, and a plurality of colors that differ from the specified detection color are set for the nozzles at the specified position for each of the plurality of color correction patches;

a second test printing unit configured to print an image of the second image data by using the print heads;

a second information acquiring unit configured to acquire information regarding a color correction patch in the second test print where the color unevenness has been reduced compared to the first test print; and a producing unit configured to produce the conversion table parameters corresponding to the nozzles at the specified position in accordance with the information acquired by the second information acquiring unit.

2. The image processing apparatus according to claim 1, wherein the plurality of nozzles are arranged on the print heads in accordance with the width of the print medium, and an image is printed onto the print medium as a result of relative movement between the print head and the print medium in a direction that differs from the direction in which the plurality of nozzles are arranged.

3. The image processing apparatus according to claim 1, wherein the first generating unit sets the plurality of detection colors that are a plurality of colors whose combinations and ratios of inks used resemble those of the color set by the first setting unit.

4. The image processing apparatus according to claim 1, wherein the converting unit converts the input image data into color signals of equivalent format, and the image processor further comprises:

an ink color converting unit configured to convert the converted color signals into a plurality of color signals in a format that differs from that of the input image data, corresponding to the inks of different colors.

5. The image processing apparatus according to claim 1, wherein the input image data is an RGB signal.

6. The image processing apparatus according to claim 5, wherein the image processing apparatus further comprises:

a unit configured to set the type of print medium; and a unit configured to convert the RGB signal of the input image data into image data corresponding to a color space reproducible by the inks of different colors on the type of print medium that has been set.

7. The image processing apparatus according to claim 1, wherein in the converting unit, the conversion table parameter associated with the position of nozzles on the print heads is a lookup table such that output color signals are set in association with color signals input into the converting unit.

8. The image processing apparatus according to claim 1, wherein in the first test print or the second test print, identifiers, that enable nozzle positions on the print heads to be specified, are printed on the print medium.

9. The image processing apparatus according to claim 1, wherein the first information acquiring unit acquires information regarding at least one foam among both ends of the specified position, and the position where color difference appears the strongest in the specified position.

10. The image processing apparatus according to claim 1, further comprising:

a unit configured to convert color signals such that, in an image formed by the ink of one color from among the inks of plural colors, color signals are converted in association with the position of the nozzles on the print heads so as to reduce density differences in the image printed by the respective nozzles.

11. The image processing apparatus according to claim 1, wherein the inks of plural colors include at least cyan, magenta, yellow, and black inks.

12. An image processing method to process color signals as part of a process for converting input image data into color signals corresponding to inks of plural colors, for the purpose of printing an image onto a print medium by using print heads, upon which a plurality of nozzle arrays for ejecting the ink of plural colors are arranged, the image processing method comprising the steps of:

a converting step for converting the input image data by using conversion table parameters associated with positions of nozzles on the print heads;

a first setting step for setting a color formed by the overlap of ink for at least two colors;

a first generating step for setting a plurality of detection colors on the basis of the color set by the first setting operation, and generating first image data made up of patches of the plurality of detection colors;

a first test printing step for printing an image of the first image data by using the print heads;

a first information acquiring step for acquiring information regarding a specified detection color from among the plurality of detection colors in the image printed by the first test printing operation, wherein the specified detection color has been confirmed to exhibit color unevenness due to variations in ejection characteristics among the plurality of nozzles, and a specified position specified as the position of nozzles on the print heads where the color unevenness was confirmed;

a second generating step for generating second image data made up of a plurality of color correction patches in which the specified detection color is set for all nozzle positions other than the specified position, and a plurality of colors that differ from the specified detection color are set for the nozzles at the specified position for each of the plurality of color correction patches;

a second test printing step for printing an image of the second image data by using the print heads;

a second information acquiring step for acquiring information regarding a color correction patch in the second test print where the color unevenness has been reduced compared to the first test print; and a producing step for producing the conversion table parameters corresponding to the nozzles at the specified position in accordance with the information acquired by the second information acquiring step.

13. A printing apparatus which processes color signals as part of a process for convert g input image data into color signals corresponding to ink of plural colors, for the purpose of printing an image onto a print medium by using print heads, upon which a plurality of nozzle arrays for ejecting the ink of plural colors are arranged, the image processing apparatus comprising:

a converting unit configured to convert the input image data by using conversion table parameters associated with positions of nozzles on the print heads;

a first setting unit configured to set a color formed by the overlap of ink for at least two colors;

a first generating unit configured to set a plurality of detection colors on the basis of the color set by the first setting means, and generate first image data made up of patches of the plurality of detection colors;

a first test printing unit configured to print an image of the first image data by using the print heads;

a first information acquiring unit configured to acquire information regarding:

a specified detection color from among the plurality of detection colors in the image printed by the first test printing unit, wherein the specified detection color has been confirmed to exhibit color unevenness due to variations in ejection characteristics among the plurality of nozzles, and a specified position specified as the position of nozzles on the print heads where the color unevenness was confirmed;

a second generating unit configured to generate second image data made up of a plurality of color correction patches in which the specified detection color is set for all nozzle positions other than the specified position, and a plurality of colors that differ from the specified detection color are set for the nozzles at the specified position for each of the plurality of color correction patches;

a second test printing unit configured to print an image of the second image data by using the print heads;

a second information acquiring unit configured to acquire information regarding a color correction patch in the second test print where the color unevenness has been reduced compared to the first test print; and a producing unit configured to produce the conversion table parameters corresponding to the nozzles at the specified position in accordance with the information acquired by the second information acquiring unit.

* * * * *